US012010756B2

(12) United States Patent
Kanamarlapudi et al.

(10) Patent No.: US 12,010,756 B2
(45) Date of Patent: Jun. 11, 2024

(54) RECOVERY OF DISCONTINUOUS RECEPTION CYCLE SYNCHRONIZATION

(71) Applicant: QUALCOMM Incorporated, San Diego, CA (US)

(72) Inventors: Sitaramanjaneyulu Kanamarlapudi, San Diego, CA (US); Krishna Chaitanya Mukkera, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/456,869

(22) Filed: Nov. 29, 2021

(65) Prior Publication Data

US 2022/0353946 A1 Nov. 3, 2022

Related U.S. Application Data

(60) Provisional application No. 63/201,450, filed on Apr. 29, 2021.

(51) Int. Cl.
*H04W 76/28* (2018.01)
*H04W 72/23* (2023.01)

(52) U.S. Cl.
CPC ........... *H04W 76/28* (2018.02); *H04W 72/23* (2023.01)

(58) Field of Classification Search
CPC ..... H04W 76/28; H04W 72/23; H04W 76/27; H04L 1/1896; H04L 5/0055; H04L 5/0053; H04L 5/0091; Y02D 30/70
See application file for complete search history.

(56) References Cited

U.S. PATENT DOCUMENTS

| 2013/0163573 | A1* | 6/2013 | Oizumi | H04L 5/0053 370/336 |
| 2013/0272260 | A1* | 10/2013 | Bitran | H04W 76/15 370/329 |

(Continued)

FOREIGN PATENT DOCUMENTS

WO    WO-2021224733 A1 * 11/2021 ........... H04L 1/1822

OTHER PUBLICATIONS

International Search Report and Written Opinion—PCT/US2022/071459—ISA/EPO—Jul. 7, 2022.

(Continued)

*Primary Examiner* — Jamal Javaid
(74) *Attorney, Agent, or Firm* — QUALCOMM Incorporated

(57) ABSTRACT

A UE may be configured to receive, from a base station, consecutive DCI messages including respective indicator values that are equal, each of the indicator values indicating an association with one of a new transmission or a retransmission. The UE may be further configured to remain in an awake state for at least a portion of a scheduled sleep state of a DRX cycle scheduled by the base station based on the respective indicator values being equal across the consecutive DCI messages. A base station may be configured to transmit, to a UE, a DCI message indicating a set of resources allocated to the UE for a transmission, and to transmit, to the UE, data to synchronize a DRX cycle with the UE based on an absence of the transmission from the set of resources allocated to the UE.

22 Claims, 9 Drawing Sheets

(56) References Cited

U.S. PATENT DOCUMENTS

2021/0092681 A1* 3/2021 Nory ................. H04W 52/0225
2022/0329360 A1* 10/2022 Lee ....................... H04L 1/1864

OTHER PUBLICATIONS

Panasonic: "Impact of Disabling HARQ on DRX", 3GPP Draft, 3GPP TSG-RAN WG2 Meeting #107bis, R2-1912570, Impact of Disabling HARQ on DRX, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 2, 2019 (Oct. 2, 2019), XP051803646, 4 Pages.

Item 2 Continued: Retrieved from the Internet: URL: https://ftp.3gpp.org/tsg_ran/WG2_RL2/TSGR2_107bis/Docs/R2-1912570.zipR2-1912570 Impact of Disabling HARQ on DRX.docx [Retrieved on Oct. 2, 2019] p. 1-p. 3.

* cited by examiner

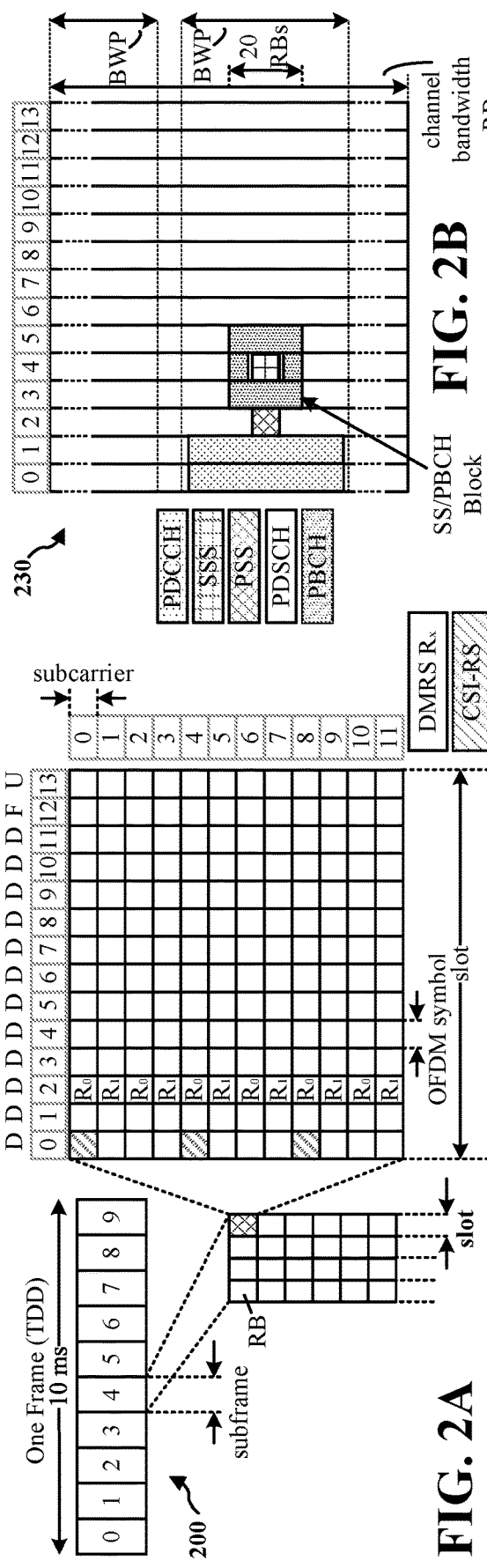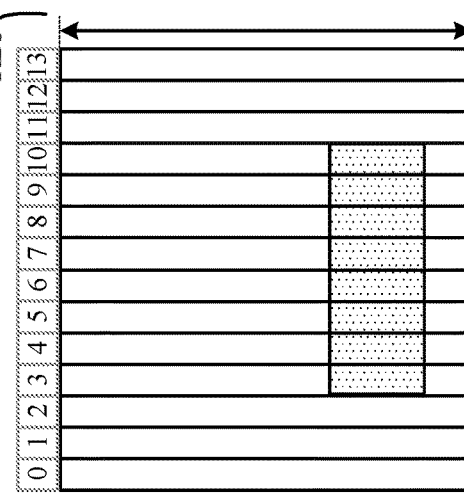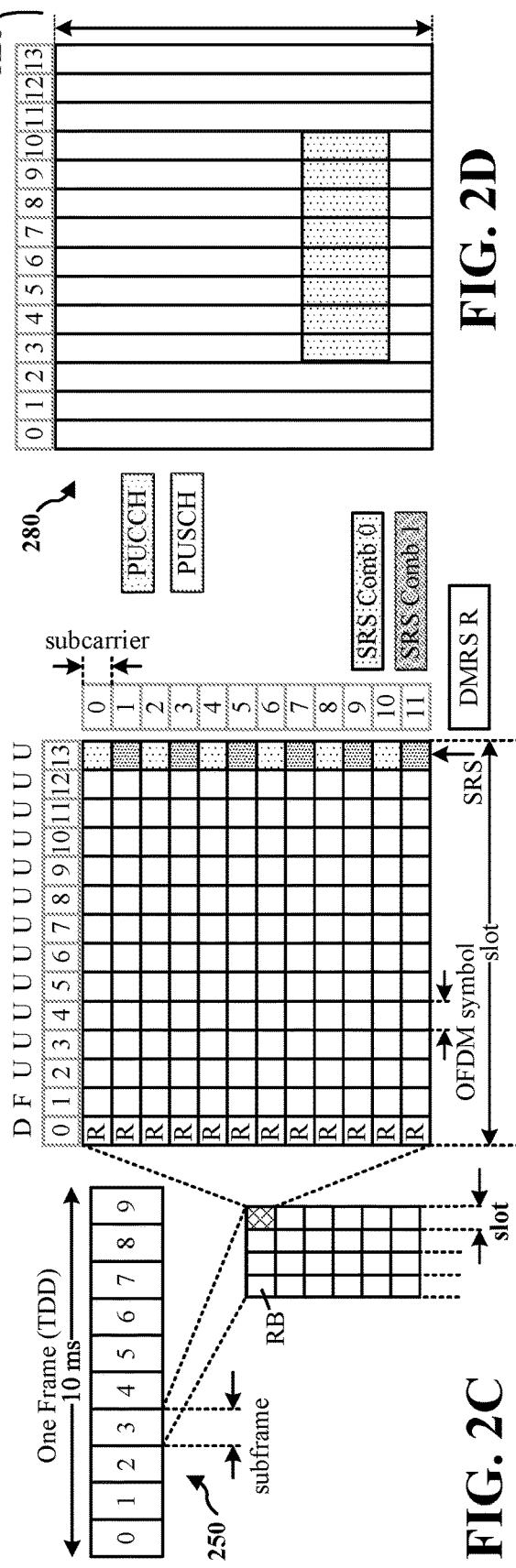
FIG. 2A  FIG. 2B  FIG. 2C  FIG. 2D

RECOVERY OF DISCONTINUOUS RECEPTION CYCLE SYNCHRONIZATION

CROSS REFERENCE TO RELATED APPLICATION(S)

This application claims the benefit of U.S. Provisional Application Ser. No. 63/201,450, entitled "RECOVERY OF DISCONTINUOUS RECEPTION CYCLE SYNCHRONIZATION" and filed on Apr. 29, 2021, the disclosure of which is expressly incorporated by reference herein in its entirety.

BACKGROUND

Technical Field

The present disclosure generally relates to communication systems, and more particularly, to discontinuous reception cycles that may be configured by a base station for a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) or component thereof configured to receive, from a base station, consecutive downlink control information (DCI) messages including respective indicator values that are equal, each of the indicator values indicating an association with one of a new transmission or a retransmission. The apparatus may be further configured to remain in an awake state for at least a portion of a scheduled sleep state of a discontinuous reception (DRX) cycle scheduled by the base station based on the respective indicator values being equal across the consecutive DCI messages.

In another aspect of the disclosure, a method, a computer-readable medium, and an apparatus are provided. The apparatus may be a base station or component thereof configured to transmit, to a UE, a DCI message indicating a set of resources allocated to the UE for a transmission; and to transmit, to the UE, data to synchronize a DRX cycle with the UE based on an absence of the transmission from the set of resources allocated to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
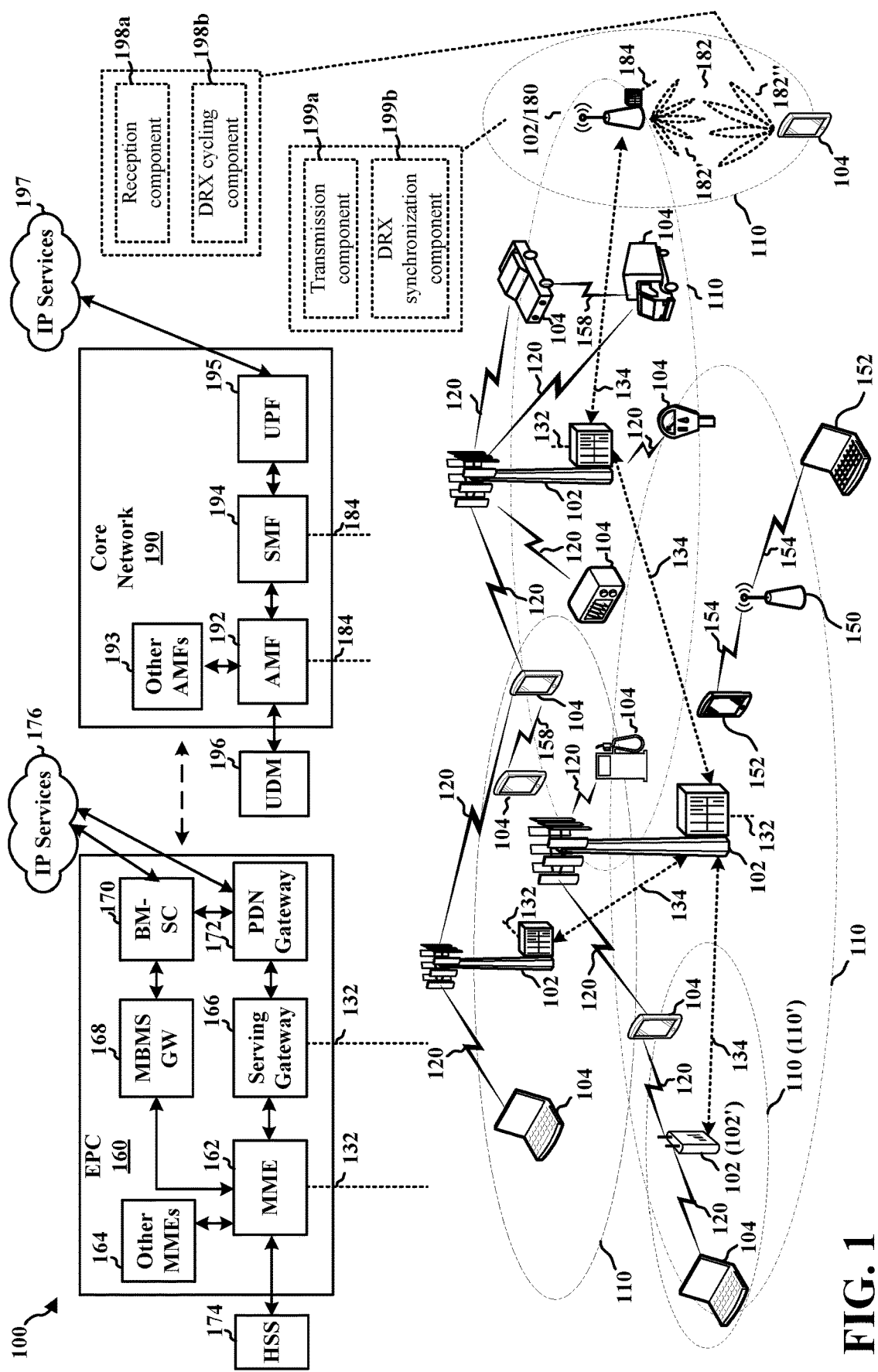
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, a person having ordinary skill in the art will recognize that these concepts and related aspects may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, a CU may implement some or all functionality of a radio resource control (RRC) layer, whereas a DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. With such a connection to the EPC 160 and/or core network 190, a base station 102 operating as an IAB donor may provide a link to the EPC 160 and/or core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 102' may have a coverage area 110' that overlaps with the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, in certain aspects, the UE 104 may include, inter alia, a reception component 198a and a DRX cycling component 198b, and the base station 102/180 may include, inter alia, a transmission component 199a and a DRX synchronization component 199b. The reception component 198a of the UE 104 may be configured to receive, from a base station 102/180, consecutive DCI messages including respective indicator values that are equal, each of the indicator values indicating an association with one of a new transmission or a retransmission. The DRX cycling component 198b of the UE 104 may be configured to remain in an awake state for at least a portion of a scheduled sleep state of a DRX cycle scheduled by the base station based on the respective indicator values being equal across the consecutive DCI messages.

The transmission component 199a of the base station 102/180 may be configured to transmit, to a UE 104, a DCI message indicating a set of resources allocated to the UE for a transmission. The DRX synchronization component 199b of the base station 102/180 may be configured to transmit, to the UE 104, data to synchronize a DRX cycle with the UE 104 based on an absence of the transmission from the set of resources allocated to the UE 104.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
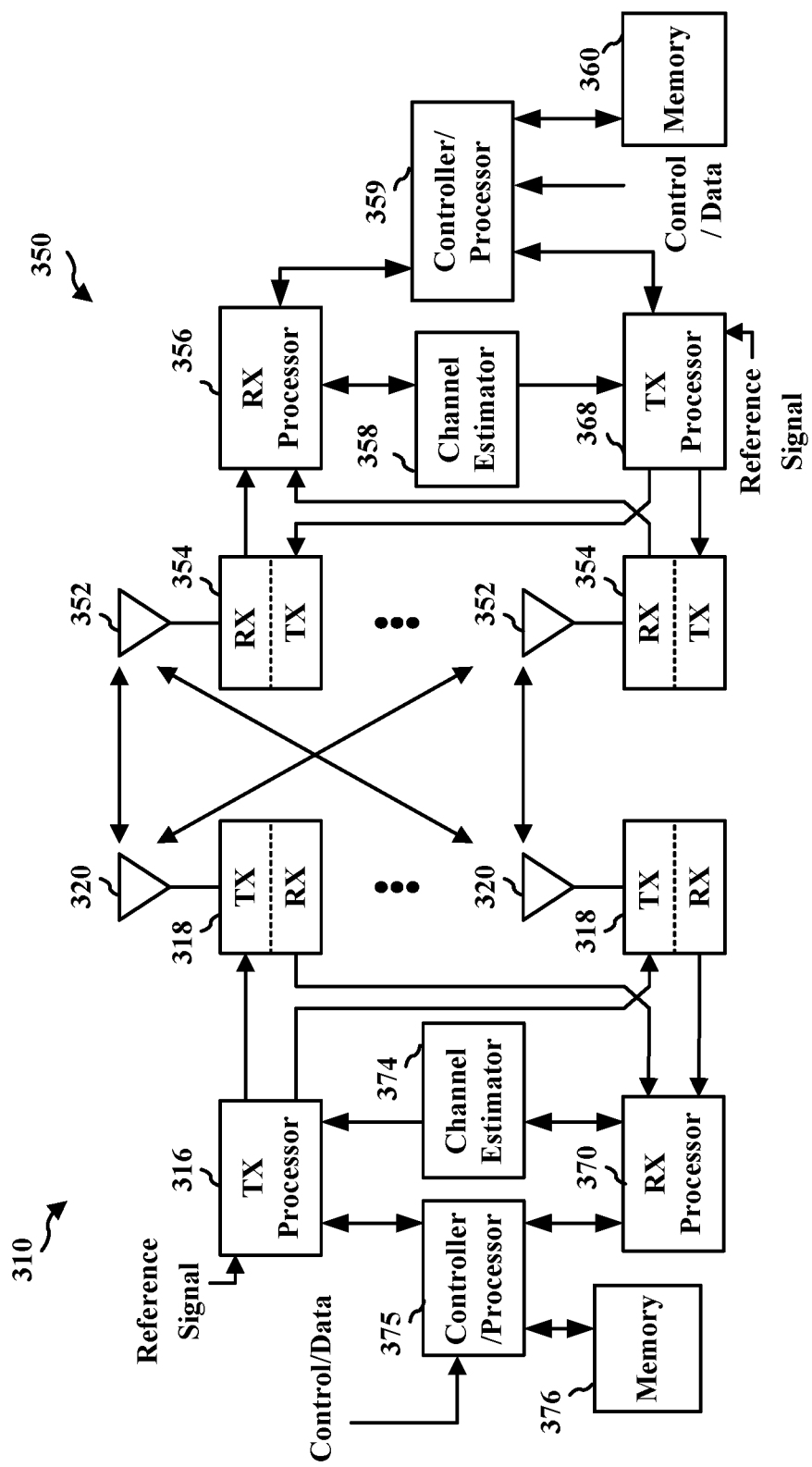
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the reception component 198a and/or the DRX cycling component 198b of FIG. 1.

In some other aspects, at least one of the TX processor 316, the RX processor 370, and the controller/processor 375 may be configured to perform aspects in connection with the transmission component 199a and/or the DRX synchronization component 199b of FIG. 1.

Figure 4:
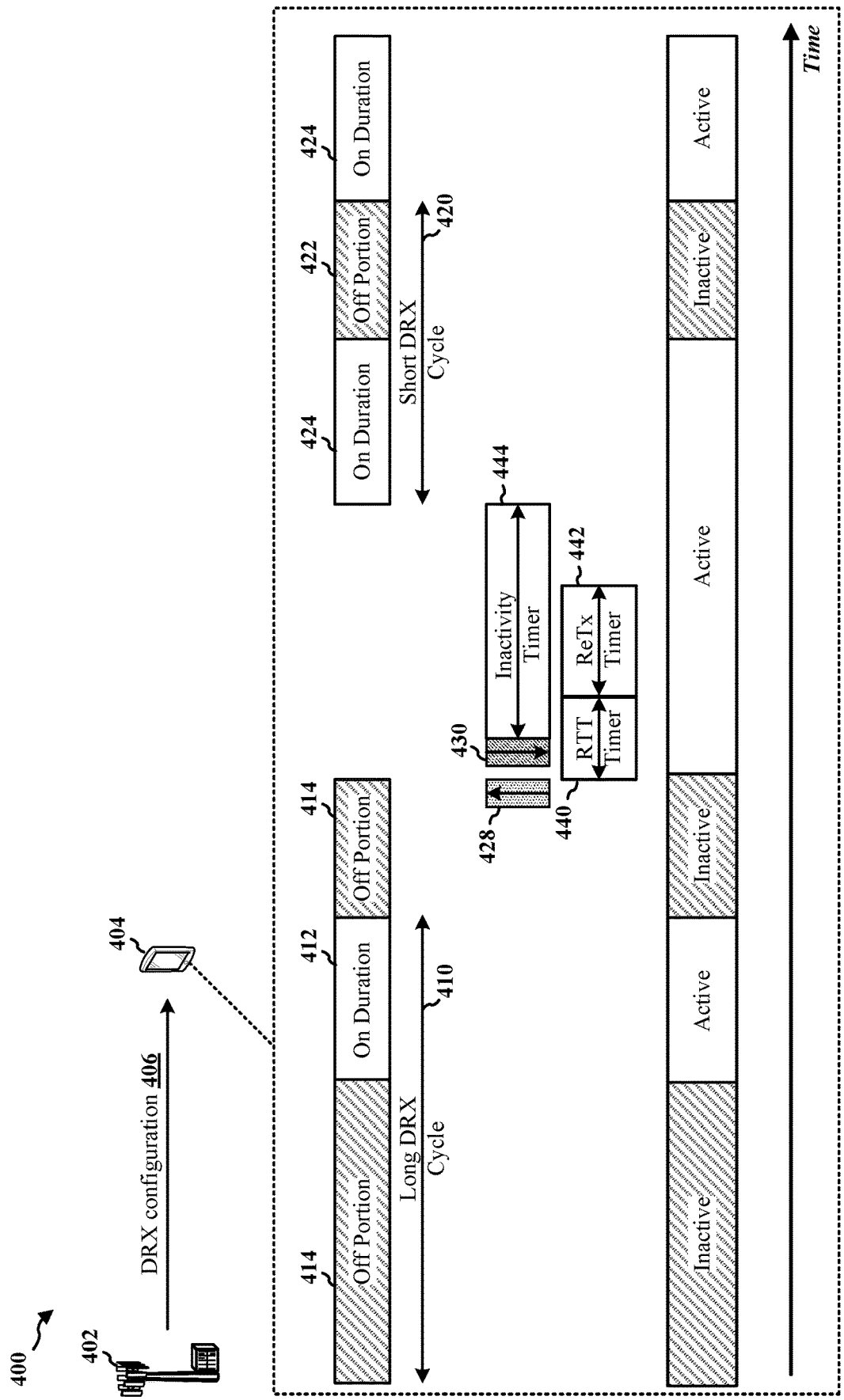
FIG. 4 is a diagram illustrating an example of a UE that operates with discontinuous reception (DRX) according to a configuration by the base station.

FIG. 4 is a diagram 400 illustrating an example of DRX operation for a link between a base station 402 and a UE 404. The link may be a Uu link, such as with LTE and/or 5G NR access networks. DRX operation may conserve power at the UE 404, in addition to reducing signaling overhead and network interference (e.g., improved signal-to-noise ratio), by reducing the amount of signaling in which the UE 404 engages.

In some aspects, the base station 402 may configure at least one DRX cycle for the UE 404. Accordingly, the base station 402 may transmit a DRX configuration 406, which may indicate the at least one DRX cycle to the UE 404. For example, the base station 402 may transmit information configuring various parameters or other values that the UE 404 may apply in order to synchronize DRX cycles with those expected of the UE 404 as tracked by the base station 402. Specifically, the DRX configuration 406 may indicate at least one of an on duration 412, 422, an inactivity timer 444, a round trip time (RTT) timer 440, a retransmission (ReTx) timer 442, a long DRX cycle 410, a short DRX cycle 420, and/or other such information. Some of the aforementioned timers may trigger transition by the UE 404 between an active, awake state (e.g., in which the UE 404 monitors for and receives downlink transmission) and an inactive, sleep state (e.g., in which the UE 404 refrains from decoding downlink resources).

The UE 404 may be configured with at least one of a long DRX cycle 410 and a short DRX cycle 420. For example, the long DRX cycle 410 may be 10-40240 ms. The long DRX cycle 410 may include an on duration 412 during which the UE 404 monitors a control channel (e.g., PDCCH) for grants and an off portion 414 during which the UE 404 may not monitor the control channel. For example, the UE 404 may reduce or power off some circuitry and/or other component(s)—specifically, receiver circuitry or other circuitry for monitoring, amplifying, converting, etc. received signaling—during the off portion 414.

When the UE 404 is configured to operate with at least one of the DRX cycles 410, 420, and the UE 404 is connected with the base station 402, the mode of operation of the UE 404 may be connected mode DRX (C-DRX). For example, when the UE 404 is in an RRC Connected state with the base station 402, as when the UE 404 may be assigned uplink grants indicated to the UE 404 on the control channel, the UE 404 may be operating in C-DRX.

Where the base station 402 intends to send data to the UE 404 on a downlink data channel (e.g., PDSCH), the base station 402 may first schedule the data on downlink data channel resources and transmit such scheduling information to the UE 404 in control information 430, which may be a DCI message. The UE 404 may be configured to monitor the downlink control channel (e.g., PDCCH) in order to detect the downlink control information 430 and identify the resources of the downlink data channel scheduled to carry the data intended for the UE 404. For example, the UE 404 may periodically monitor the downlink control channel, e.g., the timing of which may be PDCCH occasions.

In order to elicit an uplink grant and request the base station 402 allocate resources for uplink transmission, the UE 404 may transmit an SR 428. Specifically, data may arrive at a lower layer (e.g., L2, such as MAC) of the UE 404, at which point the data may be buffered while an SR procedure is triggered for the UE 404 in which the UE 404 may transmit an SR 428 and await an uplink grant, which may be included in the control information 430. If the arrival of uplink data from a higher layer coincides with an off portion of a long DRX cycle 410 or an off portion 424 of a short DRX cycle 420, the UE 404 may transition out of an inactive state into an active state in order to find a grant responsive to the SR transmission.

In response to the SR 428, the base station 402 may transmit control information 430 (e.g., DCI), which may indicate a grant including resources allocated to the UE 404 on an uplink (data) channel for transmission of uplink data pending and buffered at the UE 404. Potentially, the base station 402 may transmit some control information to the UE 404 for downlink data, as well, as the base station 402 may assume that the UE 404 will be awake for a duration that is sufficient to receive downlink data while the inactivity timer.

The UE 404 may find the control information 430 (and grant) by decoding information on resources of the control channel; however, such decoding may be blind decoding for which the UE 404 (continuously) attempts to decode any information on the control channel having the potential to be a grant for the UE 404 using an radio network temporary identifier (RNTI) of the UE 404 to evaluate a cyclic redundancy check (CRC) or other similar data integrity/security check. If the check using the UE RNTI passes, then the information on the control channel is intended for the UE 404. If such a check using the UE RNTI fails, the UE ceases decoding the information on the control channel.

Potentially, the UE 404 may fail to receive the control information 430, e.g., because either the UE 404 missed the control information 430 or, if the UE 404 is expecting the control information 430 to include a grant in response to an SR 428, the base station 402 missed the SR 428 or was unable to allocate resources to the UE 404 in response to the SR 428. In aspects in which the control information 430 provides an uplink grant to the UE 404, the UE 404 may fail to transmit pending data on the granted resources if the UE 404 misses the control information 430, as the UE 404 will be unaware of which resources have been allocated to the UE 404. In aspects in which the control information 430 is scheduling a downlink data transmission, the UE 404 may fail to decode the information on the scheduled downlink data channel resources if the UE 404 misses the control information 430, as the UE 404 may be unaware of which downlink data channel resources are carrying data intended for the UE 404.

In some instances, the UE 404 may be configured to retransmit the SR, such as when some uplink data remains pending for a period of time following SR transmission. For example, SR retransmission may be conditioned upon whether data is pending uplink transmission (and whether an SR prohibit timer is running), but SR transmission may be agnostic to whether any grant has been received.

In some aspects, the UE 404 may be configured with an SR prohibit timer to define a duration following transmission of an SR 428 that the UE 404 is to wait before retransmitting an SR where the earlier SR goes unanswered. If the UE 404 does not receive a grant for uplink transmission in response to an SR 428, the UE 404 may retransmit the SR upon expiration of the SR prohibit timer—although the UE 404 does not necessarily need to retransmit the SR, such as when pending uplink data is of a relatively lower priority. SR retransmission assumes that the UE 404 has not already satisfied (e.g., met or exceeded) a maximum number of SR retransmission attempts.

In some aspects, the UE 404 may initiate the RTT timer 440 for a HARQ process of a transmission. If the transmission is an uplink transmission, such as an SR, the RTT timer 440 may start at the end of the uplink transmission. If the transmission is a downlink transmission, the RTT timer 440 may start at the end of an ACK/NACK for the downlink transmission. The RTT timer 440 may measure an amount of time until the UE 404 is to monitor for a grant or scheduling information for a retransmission. The UE 404 may start the ReTX timer 442 to monitor a window during which a grant or schedule for the retransmission may be received.

If the UE 404 receives control information for a retransmission, the UE 404 may start the RTT timer 440 again and monitor for control information again while the ReTx timer 442 is running. Because control information (e.g., scheduling information and/or grant) for a retransmission does not restart the inactivity timer 444, the RTT timer 440 and/or the retransmission timer 442 may run while the UE 404 is in the short DRX cycle. The UE 404 may monitor for the retransmission of control information during the short DRX cycle 420 even if the UE 404 is not in the on duration 422.

Figure 5:
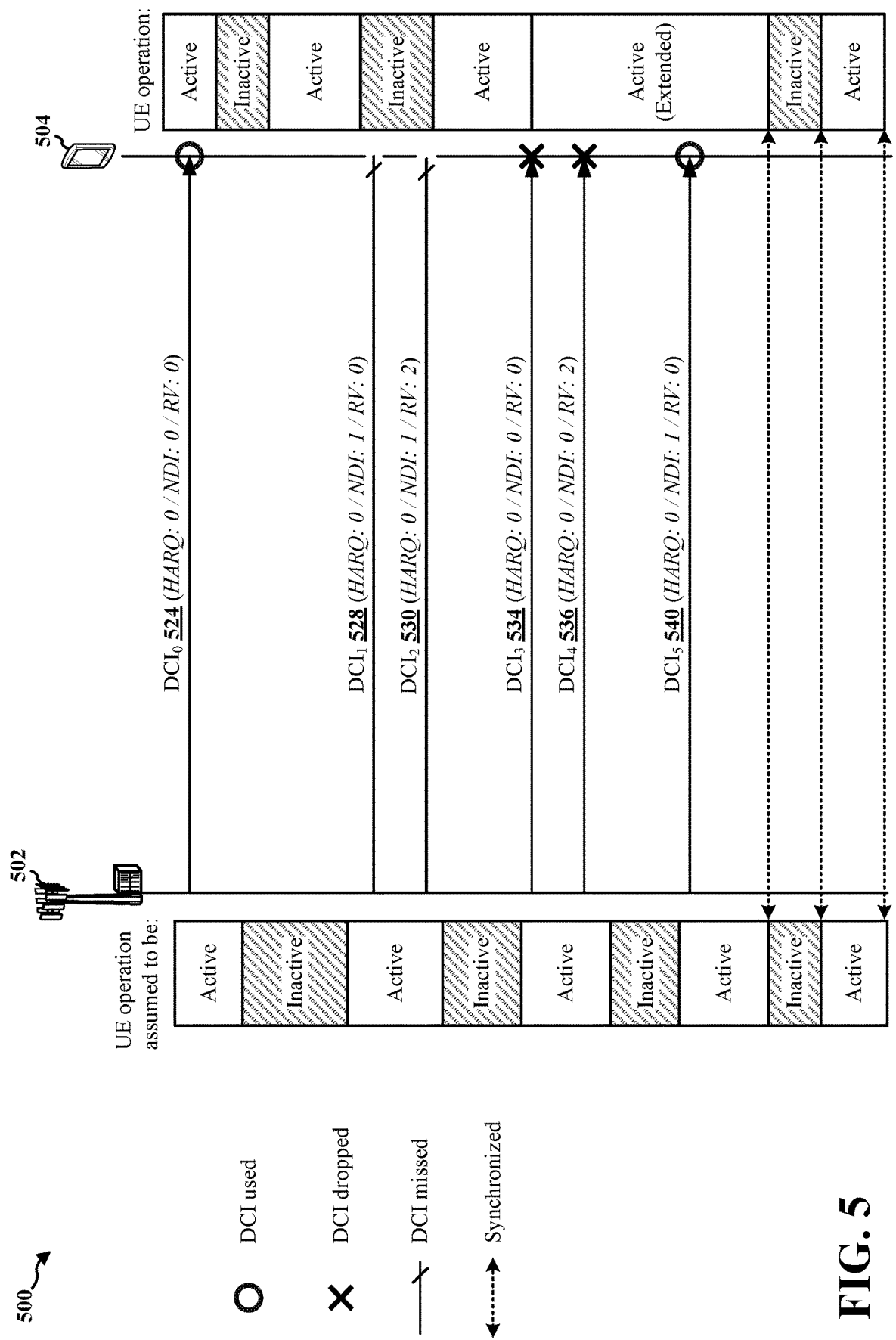
FIG. 5 is a call flow diagram illustrating an example of a base station and a UE that may reduce or prevent the frequency with which control information is missed by the UE operating in a DRX mode.

FIG. 5 is a call flow diagram 500 illustrating a base station 502 and a UE 504 configured for recovery of DRX cycle synchronization to avoid missing control information. When the UE 404 is operating in a DRX cycle, the off portion may be interrupted whenever uplink data arrives at the lower layer(s) (e.g., L2) of the UE 504. The arrival of such uplink data may trigger the SR transmission procedure, which may, in turn, trigger the UE 504 to exit the DRX cycle and transmit data upon receiving control information having an uplink grant for the UE transmission.

While in the active state, triggered as part of the SR procedure or scheduled as part of the UE DRX cycle, the base station 502 may transmit downlink data to the UE 504 before expiration of the inactivity timer, such as remaining data the base station 502 was unable to schedule during the prior on duration. Upon expiration of the inactivity timer, and barring any further scheduled downlink data or granted uplink data, the UE 504 may transition to the off portion of the DRX cycle, in which some circuitry (e.g., receiver circuitry) of the UE 504 may be in a sleep/inactive state.

As described, supra, for the SR procedure, the base station 502 may transmit control information to the UE 504 indicating an uplink grant, which may be associated with a specific carrier and HARQ process. The control information may further include a parameter labeled "New Data Indicator" (NDI), which may carry a bit value indicative of whether the current grant is for the associated HARQ process as part of a retransmission or a new transmission. In an ideal communication environment, the NDI bit value will toggle between each control information (e.g., for the downlink data channel or for the uplink data channel) transmission in order to indicate successful communication that does not need to be retransmitted.

In other words, the NDI value in each control information will toggle for each new HARQ MAC TB the base station 502 is to transmit (on the downlink) or is expecting (on the uplink). However, in non-ideal conditions, some retransmission(s) may occur, in which case the NDI value will not toggle. Rather, the base station 502 may hold the NDI value as the same across consecutive control information messages, with the subsequent control information messages having the same NDI value(s) as the original control information messages indicating a retransmission. In some aspects, the base station 502 may additionally configure a redundancy version (RV) of zero (0), two (2), three (3), or one (1) for a retransmission, which may be indicated in the control message(s) for retransmission so that the base station 402 is able to perform soft-combining.

Each control information message may further indicate a value corresponding to a modulation and coding scheme (MCS) to be used on the transmission or retransmission. Some MCS values may be reserved for retransmissions. For example, a reserved MCS value may indicate the same MCS will be or is to be used as was previously indicated in an earlier control information message for this (re)transmission. Thus, the UE 504 may be informed of how to transmit or receive through various fields of control information messages.

However, the UE 504 may lack a mechanism for efficiently recovering from instances in which control channel messages are missed. Rather, if the UE 504 misses a control message, the UE may experience one or more bad decodes of subsequent control information messages. Such bad decodes and other related errors may appreciably increase latency of the SR procedure.

In some networks, for example, control information messages may simply be assumed to be (nearly) perfectly reliable, as control information messages may be transmitted with fewer bits, higher spectral efficiency, and/or more protection relative to other messages, such as data messages. Such an assumption ignores the case in which the UE 504 actually missed a control information message, in which case the NDI value will be toggled across control information messages transmitted by the UE 545 but will be viewed by the UE 504 as not toggling (as the UE 504 missed the message having the toggled value).

Illustratively, the base station 502 may transmit $DCI_0$ 524 to the UE 504. $DCI_0$ 524 may include an NDI value of 0 and an RV of 0 for a new transmission on HARQ process 0. The NDI value may match that expected by the UE 504, and so the UE may proceed to use the $DCI_0$ 524, e.g., which may indicate either a grant on which the UE 504 may transmit or a schedule of downlink data that the UE 504 may receive. The UE 504 may then be expecting DCI having an NDI value of 1 on HARQ process one.

The base station 502 may subsequently transmit $DCI_1$ 528 for a new MAC transmission (e.g., new HARQ MAC TB) having the NDI value toggled. However, the UE 504 may fail to receive the next $DCI_1$ 528. For example, the DRX cycle of the UE 504 may be unsynchronized with the UE DRX cycle tracked by the base station 502, and the base station 502 may have transmitted the next $DCI_1$ 52 while the UE 504 was in the inactive/sleep state, such as during the off portion of the DRX cycle during which time the UE 504 may fail to monitor the downlink control channel for DCI messages.

The base station 502 may attempt a retransmission by transmitting $DCI_2$ 530. In $DCI_2$ 530, the NDI value may not be toggled from $DCI_1$ 528 but is toggled from $DCI_0$ 525. Thus, the UE 504 may be able to use $DCI_2$ 530 for uplink transmission if $DCI_2$ carries an uplink grant and does not include an MCS value that is reserved for retransmissions. In such a case, the UE 504 may simply treat $DCI_2$ 530 as a grant for a new HARQ MAC TB, even if the base station 502 intended $DCI_2$ 530 to be for a retransmission.

As illustrated, however, the UE 504 may also the UE 504 may fail to receive the $DCI_2$ 530. For example, the DRX cycle of the UE 504 may be unsynchronized with the UE DRX cycle tracked by the base station 502, and may extend over each DCI transmission occasion in which the base station 502 transmits DCI having the NDI value toggled from the $DCI_0$ 524. Depending upon various implementations and/or other factors, the base station 502 may attempt zero or more (e.g., three) retransmissions of a DCI message, and if all of the UE 504 misses all of the initial transmission and the zero or more retransmissions, then the base station 502 may move on to other operations.

For example, the base station 502 may advance to the next MAC HARQ TB, e.g., in order to prevent latency accumulation. As the next MAC HARQ TB may be associated with a new transmission, the base station 502 may toggle the NDI value from 1 to 0. The base station 502 may then transmit $DCI_3$ 534, including the NDI value of 0 and RV of 0 for the new MAC HARQ TB for the HARQ process 0. While the base station 502 is toggling the NDI value across the DCI associated with new transmissions, the UE 504 may have last received $DCI_0$ 524 having the NDI value of 0. Thus, the UE 504 may be expecting DCI with an NDI value of 1. Consequently, the UE 504 may handle the DCI$_3$ 534 as an error or a bad decode upon receiving the message from the base station 502.

Similarly, in another example aspect, the base station 502 may transmit DCI$_4$ 536 to the UE 504 after the UE 504 drops DCI$_3$ 534. DCI$_4$ 536 may include an NDI value that is not toggled from DCI$_3$ 534 and may include an RV of 2, both of which may indicate to the UE 504 that DCI$_4$ 536 is for a retransmission. In addition, DCI$_4$ 536 may include an MCS value to be used for the retransmission. Some MCS values may correspond to reserved values, one or more of which may be functionally equivalent to indicating the same MCS as the new transmission. However, as the UE 504 missed the DCI for the new transmission or interpreted the DCI for the new transmission as a DCI for a retransmission, the UE 504 may be unable to discern which MCS value to use. Therefore, the UE 504 may drop DCI$_4$ 536. Alternatively, if the MCS value is not reserved, the UE 504 may use the DCI$_4$ 536—e.g., the UE 504 may treat the DCI$_4$ 536 as a grant for a new transmission.

In existing systems, a UE will treat consecutive messages having the same NDI value as an error condition that the UE is unequipped to resolve. Rather, the UE 504 will discard the DCI message and continue operation as if the UE had not been provided a grant for transmitting uplink data or scheduling information for receiving downlink data.

Due to such operation, the UE may resume the DRX cycle (e.g., at expiration of the inactivity timer), which may already been unsynchronized with the UE DRX cycle tracked at the base station 502. Therefore, the potential exists for the UE 504 to again miss control information if the base station 502 transmits DCI intended for the UE 504 while the UE 504 is operating in the inactive/sleep state. Such circumstances may further exacerbate latency and other error conditions experienced by the UE 504.

In contrast, a UE of the present disclosure may be configured to determine that the consecutive DCI message include respective NDI values that are equal, and further, the UE may determine that such a commonality indicates that the UE 504 has missed at least one DCI message from the base station 502. The UE 504 may be configured to recover from the condition in which the UE 504 has missed one or more DCI messages, resulting in bad decodes of some subsequent DCI messages. In particular, the UE 504 may be configured to remain in an awake state for at least a portion of a scheduled sleep state of a DRX cycle scheduled by the base station 502 based on the respective indicator values being equal across the consecutive DCI messages DCI$_0$ 524 and DCI$_3$ 534.

In other words, the UE 504 may autonomously extend the time that the UE 504 is operating in the active or awake state in response to detecting an error condition, which may result from bad decodes of DCI. The UE 504 may do so based on an assumption that DCI was missed due to a loss of DRX cycle synchronization, which resulted in the UE 504 being in the inactive/sleep state when the base station 502 believed the UE 504 to be in the awake/active state (and so monitoring the downlink control channel at periodic occasions). By autonomously extending the DRX cycle, the UE 504 may eliminate the risk of missing DCI while the UE 504 is in the sleep state.

By remaining in awake state, the UE 504 may attempt to synchronize the DRX cycle with the base station 502 502. Potentially, the UE 504 may synchronize the DRX cycle with the base station 502 while remaining in the awake state for the at least a portion of the scheduled sleep state. The UE 504 may cause the base station 502 and the UE 504 to begin measuring a DRX inactivity timer and/or DRX on duration timer from a common starting point. For example, the UE 504 may transmit a message that is commonly understood by both the base station 502 and the UE 504 to initiate a timer upon expiration of which the UE 504 enters an inactive state or otherwise initiates a DRX cycle, or the UE 504 may withhold or delay any messages affecting another timer upon receiving a message from the base station 502 that triggers the other timer, upon expiration of which the UE 504 enters an inactive state or otherwise initiates a DRX cycle.

Illustratively, the UE 504 may communicate some active data with the base station 502 during the autonomously extended awake state, which may include data that causes the DRX inactivity timer to be restarted. While the DRX inactivity timer is running, the UE 504 may refrain from any operations affecting the DRX inactivity timer. The SR procedure may function as a unified starting point understood by both the UE 504 and the base station 502 as initiating the DRX inactivity timer for the UE 504. At expiration of the DRX inactivity timer, the UE 504 may transition to the sleep or inactive state or the UE 504 may otherwise initiate a DRX cycle. By virtue of the UE 504 and the base station 502 having a contemporaneous common trigger (e.g., SR procedure) from which to calculate timer duration and DRX cycle initiation for the UE 504, the DRX cycling occurring at the UE 504 will be synchronized with the tracking of such DRX cycling for the UE 504 at the base station 502.

Ultimately, the base station 502 may reach a ceiling threshold for retransmission DCI having the same NDI value, and the base station 502 may advance to a new HARQ MAC TB. At that point, the base station 502 may transmit DCI$_5$ 540, which may be DCI for a new retransmission, and therefore, may include the toggled NDI value. The UE 504 may receive DCI$_5$ 540 from the base station 502 having toggled NDI value indicating an association with a new transmission and, in response, the UE 504 may initiate an inactivity timer. The initiation of the inactivity timer may be synchronized with initiation of a corresponding timer at the base station 502 (e.g., UE DRX inactivity timer tracked at the base station 502).

Therefore, the UE 504 may acquire DRX cycle synchronization, as both the UE 504 and the base station 502 may track DRX cycles for the UE 504 from a common or unified event or trigger, the occurrence of which may be contemporaneously observed at both the UE 504 and the base station 502. The UE 504 may then resume compliance with the DRX cycle scheduled by the base station 502 based on synchronizing the DRX cycle. For example, the UE 504 may cease autonomously extending the awake state upon receiving the other DCI message having the indicator value indicting an association with the new transmission, as the UE 504 may assume that DRX cycling at the UE 504 and the tracking thereof at the base station 502 are synchronized following the active data exchange according to the DCI$_5$ 540.

In some other aspects, the base station 502 may be configured to detect whether uplink data is absent from the resources allocated to the UE 504 on the uplink data channel, e.g., as indicated in DCI$_1$ 528 and DCI$_2$ 530. If the base station 502 may fail to detect the uplink data, the base station 502 may assume that the UE 504 was in a sleep state of a DRX cycle when DCI$_1$ 528 and DCI$_2$ 530 were transmitted to the UE 504, and so DCI$_1$ 528 and DCI$_2$ 530 were not received by the UE 504. From such an assumption, the base station 502 may deduce that the DRX cycling tracked for the UE 504 at the base station 502 is unsynchronized with the DRX cycling currently implemented at the UE 504.

In such other aspects, the base station 502 may refrain from transmitting $DCI_3$ 534 and $DCI_4$ 536, to the UE 504. Rather, the base station 502 may determine that the UE DRX cycle should be resynchronized with the UE 504 based on the absence of the transmission from the set of resources allocated to the UE 504. The base station 502 may transmit data to force synchronization of the UE DRX cycle tracked at the base station 502 with the DRX cycle implemented at the UE 504. For example, the base station 502 may transmit, to the UE 504, $DCI_5$ 540 scheduling data based on the absence of the transmission from the UE 504.

$DCI_5$ 540 may function as a common or unified point or trigger at which to initiate a respective DRX timer (e.g., DRX inactivity timer) at each of the base station 502 and the UE 504. In some aspects, the DCI message may be of format 1_0, format 1_1, or format 1_2. $DCI_5$ 540 may include an indicator value indicating an association with a new transmission, e.g., on the downlink. For example, the indicator value may be an NDI value that is toggled from the last $DCI_0$ 524, which may be a point at which the UE 504 may assumed to be running DRX inactivity timer.

In some aspects, the base station 502 may transmit data to the UE 504 on the other set of resources allocated according to $DCI_5$ 540. In some aspects, the base station 502 may transmit "dummy" data or mock data to the UE 504, such as data including a set of zero or null values. Such dummy or mock data may be intended to have no effect at the UE 504 other than to prevent the UE 504 from determining that downlink data scheduled by the other DCI message was missed by the UE 504, which may cause the UE 504 to request a retransmission, transmit NACK feedback, or otherwise throw an error. In some other aspects, the base station 502 may transmit real data that is intended for the UE 504, such as data that should be transmitted to the UE 504 regardless of the circumstance.

After transmission, to the UE 504, of data to synchronize the DRX cycle with the base station 502 may assume DRX cycle synchronization with the UE 504. That is, the base station 502 may assume that the UE 504 DRX cycle tracked at the base station 502 is synchronized with the implementation of the DRX cycle at the UE 504. Subsequently, the base station 502 may operate under the assumption that tracking of the UE DRX cycle at the base station 502 is consistent with the implementation at the UE 504. For example, the base station 502 may subsequently receive an SR from the UE 504, and the base station 502 may transmit a DCI message on the downlink control channel to the UE 504 in order to provide the UE 504 with a grant responsive to the SR. The base station 502 may transmit such a DCI message during a time that the UE 504 is in an awake state, as the UE 504 DRX cycle may be synchronized at the base station 502 and the UE 504. If the base station 502 fails to receive an uplink transmission from the UE 504 based on that DCI message, then the base station 502 may believe that the issue resulting in the absent uplink transmission lies somewhere other than DRX cycling synchronization.

Figure 6:
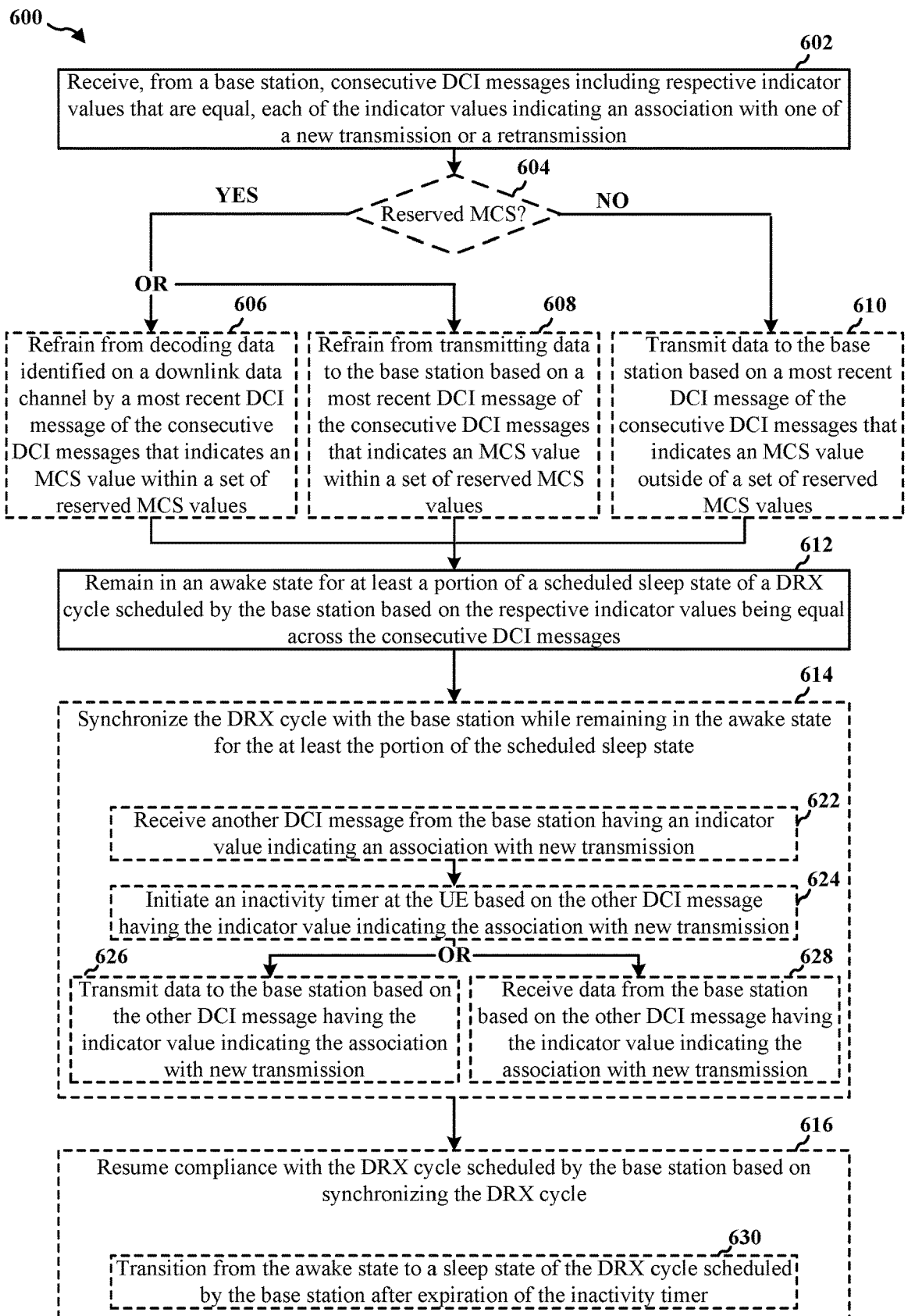
FIG. 6 is a flowchart of a method of wireless communication at a UE.

FIG. 6 is a flowchart 600 of a method of wireless communication. The method may be performed by a UE (e.g., one or more of the UE 104, UE 350, UE 404, UE 504, UE 604, described supra), an apparatus (e.g., apparatus 902), or a component(s) thereof. In various different aspects, one or more of the illustrated operations may be transposed, omitted, or contemporaneously performed.

At 602, the UE receives, from a base station, consecutive DCI messages that include respective indicator values that are equal. Each of the indicator values may indicate an association of the corresponding DCI message with one of a new transmission or a retransmission. For example, each of the indicator values may be a bit value equal to either zero (0) or one (1) in an NDI field of the corresponding DCI message. In other words, the UE receives, from the base station, at least two DCI messages in a row across which the NDI value is not toggled.

At 604, the UE may determine whether the value indicated in an MCS field is reserved for DCI messages associated with retransmissions. For example, the value in the MCS field correspond with a cell or element in a table (e.g., a lookup table or database table) for which an MCS attribute or header (e.g., column header or row header) serves as at least a part of a key.

In some aspects, the UE may compare the received value in the MCS field with one or more cell or element values of an MCS attribute or header in a table, and the UE may identify a cell or element value of an MCS attribute that is equal to the received value of the MCS field. The UE may identify whether the cell or element value is also associated with an attribute or header indicating that the cell or element value is reserved for control information related to retransmissions. For example, the received value may correspond with a cell or element value that forms part of a record associated with an attribute indicating the record is reserved for use with retransmissions. The received value may correspond to a cell or element value that is functionally equivalent to indicating the same MCS as was indicated by control information previously transmitted by the base station for an initial transmission.

As the consecutive DCI messages are received with the same indicator values, the UE may be unable to discern which DCI included a toggled value in a respective NDI field for the initial transmission. Consequently, the UE may be unable to perform any actions based on the received DCI message having the reserved MCS value because the UE may be unable to identify which MCS is to be used from multiple DCI messages having the same NDI value—in particular, the UE may have missed the DCI message indicating the allocation for the initial transmission, and so such MCS information may be entirely unavailable to the UE.

Thus, where the DCI message includes an MCS value that corresponds to a reserved MCS value (and potentially, the UE failed to receive the DCI message for the initial transmission), the UE may lack sufficient information for communicating data based on the DCI. Where such a DCI message indicates a schedule for downlink data on a downlink data channel, e.g., as with DCI messages of format 1_0, format 1_1, and format 1_2, then:

At 606, the UE may refrain from decoding data identified on a downlink data channel based on the most recent DCI message of the consecutive DCI message that indicates an MCS value within a set of reserved MCS values. In other words, the UE may ignore the information carried on the downlink data channel resources scheduled by the most recent DCI message, e.g., because either the UE assumes that the information on the downlink data channel is a retransmission that the UE has already received or the UE is unable to identify the applicable MCS. For example, the UE may refrain from decoding the identified downlink data by refraining from tuning receiver circuitry away from a current configuration on which the control channel is received the downlink data and/or the UE may decline to descramble at least a part of a downlink data transmission on the downlink data channel. The UE may resume monitoring the control channel in order to receive other DCI messages at the appropriate occasions, or the UE may resume a DRX cycle if no further control channel occasions remain for that control channel period.

Where such a DCI message indicates a grant for uplink data on an uplink data channel, e.g., as with DCI messages of format 0_0, format 0_1, and format 0_2 then:

At 608, the UE may refrain from transmitting data to the base station based on the most recent DCI message of the consecutive DCI message that indicates an MCS value within a set of reserved MCS values. In other words, the UE may ignore the uplink grant indicated by the most recently received DCI message, e.g., because the UE is unable to discern the MCS with which to transmit uplink data from such a DCI message if the UE fails to successfully receive the DCI message having the original grant for the initial transmission (e.g., in which the MCS value does not correspond to a value reserved for retransmissions). For example, the UE may refrain from transmitting data to the base station by refraining from tuning transmitter circuitry to the resources on the uplink data channel indicated by the DCI message and/or the UE may maintain a current uplink buffer status because the UE does not transmit any pending uplink data. The UE may resume monitoring the control channel in order to receive other DCI messages at the appropriate occasions, or the UE may resume a DRX cycle if the DRX inactivity timer expires or a ceiling threshold limiting the number of SR retransmissions is reached.

However, even where consecutive DCI messages are received with the same NDI values, the UE may utilize the information included therein, as whether a transmission is regarded as an "initial" transmission or a "retransmission" may have little, if any, practical impact upon UE operation if the relevant parameters are provided—although the RV may be two (2), three (3), or one (1) in DCI messages intended for retransmissions. Thus, if the MCS value in the most recent DCI message is not included in a set of MCS values reserved for retransmission, the UE may discern the applicable parameters to be used for a transmission (even if the base station regards the transmission as a retransmission). For example, where the DCI message is of a format for downlink data, the UE may discern the resources on the downlink data channel on which to receive a transmission, as well as the MCS with which to receive the transmission. Accordingly, the UE may receive the transmission on the downlink data channel, e.g., even if the base station is retransmitting the transmission (e.g., with RV two, three, or one). UE may be unable to identify which MCS is to be used from multiple DCI messages having the same NDI value—in particular, the UE may have missed the DCI message indicating the allocation for the initial transmission, and so such MCS information may be entirely unavailable to the UE.

Similarly, where the DCI message does not include an MCS value that is reserved for retransmissions, the UE may obtain sufficient information for uplink transmission from a DCI message that is intended to be used for a retransmission. Where such a DCI message indicates a grant for uplink data on an uplink data channel, e.g., as with DCI messages of format 0_0, format 0_1, and format 0_2 then:

At 610, the UE may transmit data to the base station based on the most recent DCI message of the consecutive DCI message that indicates an MCS value outside of the set of MCS values reserved for retransmission. In particular, the UE may simply use the parameters of the DCI intended for a retransmission (e.g., even with the RV being two, three, or one or otherwise). For example, the UE may transmit an uplink transmission on the uplink data channel resources indicated by the retransmission grant, and the UE may do so using an MCS corresponding with the MCS value of the most recently received DCI message.

Receiving consecutive DCI messages without the NDI values being toggled across the DCI messages may indicate a loss of synchronization between the base station and the UE with respect to DRX cycles of the UE. DCI messages may be (frequently or always) transmitted with one or more mechanisms designed to enhance DCI reliability—e.g., DCI messages may be transmitted with fewer bits, higher spectral efficiency, and/or more protection relative to other messages, such as data messages. Therefore, the UE may assume that the most likely cause of missing or losing a DCI message (in which the NDI value was toggled) is attributable to a lack of synchronization between DRX cycle tracking for the UE at the base station and the actual implementation of the DRX cycles at the UE. Such unsynchronized DRX cycles may result in the base station transmitting a DCI message(s) to the UE while the UE is in the sleep state, and so not monitoring the control channel for DCI messages from the base station.

Once the UE has ascertained the likely root of the ostensibly erroneous DCI messages, the UE may perform various operations to recover from this loss of synchronization so that conventional operation with DRX cycles may resume without disrupting DCI message communication. The DRX cycles are measured relative to timing units, which may be at a scale of frames (e.g., system frame number), slots, PDCCH occasions, or other timing unit scale or combination of timing unit scales. Therefore, reacquisition of synchronization may be achievable through a common or unified event or trigger understood by both the UE and the base station to initiate a DRX cycle, such as expiration of the DRX inactivity timer.

However, expiration of the DRX inactivity timer assumes that such a timer is contemporaneously initiated at both the base station (for tracking UE active and inactive states) and the UE (for transitioning between the active, awake state and the inactive, sleep state. The initiation of the DRX inactivity timer may be predicated upon receiving a DCI message from the base station, the timing of which may be unpredictable (at least on the downlink). Therefore, the UE may act to avoid missing a DCI message so that DRX cycle synchronization may be reacquired as soon as possible and further messaging loss or added latency may be avoided.

At 612, the UE remains in an awake state for at least a portion of a scheduled sleep state of a DRX cycle scheduled by the base station based on the respective indicator values being equal across the consecutive DCI messages. For example, the UE may measure timing units (e.g., system frame numbers) until expiration of a DRX inactivity timer or on duration timer managed at the UE. The UE may detect expiration of the timer, such as when a certain number of system frames have elapsed, as which point the UE should transition into an inactive or sleep state according to DRX protocol. However, the UE may refrain from transitioning into such an inactive or sleep state upon detecting expiration of a timer. Rather, the UE may remain in an awake for at least a portion of the time period that the UE is configured to be in the sleep state. That is, the UE may autonomously extend the on duration or active period. During this time period, the UE may monitor the control channel (e.g., PDCCH) for DCI messages intended for the UE, and potentially, the UE may transmit (or retransmit) one or more SRs.

At 614, the UE may synchronize the DRX cycle with the base station while in the awake state. Potentially, the UE may synchronize the DRX cycle with the base station while remaining in the awake state for the at least a portion of the scheduled sleep state. The UE may cause the base station and the UE to begin measuring a DRX inactivity timer and/or DRX on duration timer from a common starting point. For example, the UE may transmit a message that is commonly understood by both the base station and the UE to initiate a timer upon expiration of which the UE enters an inactive state or otherwise initiates a DRX cycle, or the UE may withhold or delay any messages affecting another timer upon receiving a message from the base station that triggers the other timer, upon expiration of which the UE enters an inactive state or otherwise initiates a DRX cycle.

Illustratively, the UE may communicate some active data with the base station during the autonomously extended awake state, which may include data that causes the DRX inactivity timer to be restarted. While the DRX inactivity timer is running, the UE may refrain from any operations affecting the DRX inactivity timer. The SR procedure may function as a unified starting point understood by both the UE and the base station as initiating the DRX inactivity timer for the UE. At expiration of the DRX inactivity timer, the UE may transition to the sleep or inactive state or the UE may otherwise initiate a DRX cycle. By virtue of the UE and the base station having a contemporaneous common trigger (e.g., SR procedure) from which to calculate timer duration and DRX cycle initiation for the UE, the DRX cycling occurring at the UE will be synchronized with the tracking of such DRX cycling for the UE at the base station.

In some aspects, the synchronization of the DRX cycle with the base station while remaining in the awake state for at least a portion of the scheduled sleep state, at 614, may include one or more operations, such as one or more of the following 622, 624, and 626 or 628.

At 622, the UE may receive another DCI message from the base station having an indicator value indicating an association with a new transmission. The other DCI message may be received subsequent to the consecutive DCI messages having the same (non-toggled) indicator value. For example, the UE may receive the other DCI message while autonomously extending the awake state of the UE—e.g., the UE may receive the other DCI message while remaining in the awake state during or after at least a portion of a scheduled sleep state that is scheduled for the UE according to a DRX configuration from the base station. The indicator value indicating an association with a new transmission may be an NDI value that is equal to the NDI value expected by the UE—e.g., the received NDI value may be toggled from the consecutive DCI messages having the same NDI value. Accordingly, the UE may determine that the other DCI message indicates a new transmission.

At 624, the UE may initiate an inactivity timer at the UE based on the other DCI message having the indicator value indicating the association with the new transmission. The initiation of the inactivity timer may be synchronized with initiation of a corresponding timer at the base station (e.g., UE DRX inactivity timer tracked at the base station). Therefore, the UE may acquire DRX cycle synchronization, as both the UE and the base station may track DRX cycles for the UE from a common or unified event or trigger, the occurrence of which may be contemporaneously observed at both the UE and the base station. In some aspects, initiating the inactivity timer at the UE based on the other DCI message having the indicator value indicating the association with the new transmission may include identifying the DCI message as a trigger for the inactivity timer, selecting a timing unit(s) from which to begin counting to measure the elapsed duration of the inactivity timer (e.g., system frame numbers, slots, PDCCH occasions, etc.), and counting each timing unit(s) toward the expiration of the inactivity timer.

At 626, the UE may transmit data to the base station based on the other DCI message having the indicator value indicating the association with the new transmission. For example, the UE may identify a resource grant indicated in the other DCI message for uplink data that the UE may have pending for uplink transmission. The UE may further identify an MCS indicated in the other DCI message. Accordingly, the UE may transmit, with the identified MCS, at least a portion of the data buffered by the UE for uplink transmission.

If the other DCI message is of a format for scheduling downlink transmissions, then:

At 628, the UE may receive data from the base station based on the other DCI message having the indicator value indicating the association with the new transmission. For example, the UE may identify a resource schedule indicated in the other DCI message for downlink data on a downlink data channel, and the UE may monitor the resources on the downlink data channel indicated by the other DCI message in order to receive the downlink data scheduled thereon.

At 616, the UE may resume compliance with the DRX cycle scheduled by the base station based on synchronizing the DRX cycle. For example, the UE may cease autonomously extending the awake state upon receiving the other DCI message having the indicator value indicting an association with the new transmission, as the UE may assume that DRX cycling at the UE and the tracking thereof at the base station are synchronized following the active data exchange according to the other DCI message (see, e.g., 622, 624, and 626 or 628, supra). The UE may initiate an on duration timer of a DRX cycle and may remain in the awake state while the on duration timer is running, during which time the UE may supply sufficient power to receiver circuitry to receive transmissions from the base station. Further, the UE may count timing units (e.g., system frames, slots, etc.) while in the awake state in order to track the elapsed duration of the on duration timer.

In some aspects, the resumption of compliance with the DRX cycle scheduled by the base station based on synchronizing the DRX cycle, at 616, may include one or more operations, such as at 630.

At 630, the UE may transition from the awake state to the sleep state of the DRX cycle scheduled by the base station after expiration of the inactivity timer. For example, the UE may measure the elapsed time of the inactivity timer, which was initiated upon receiving the other DCI message on the downlink control channel (e.g., PDCCH). To do so, the UE may count a number of timing units (e.g., system frames, slots, PDCCH occasions, etc.) until a timing threshold is satisfied (e.g., met or exceeded or otherwise reached). The UE may detect that the timing threshold is satisfied when the count of the number of timing units is equal to the timing threshold or, if the UE is counting down, when the count of the number of timing units reaches a floor threshold, such as zero (0). Upon detecting that the inactivity timer has expired, the UE may resume operation according to the DRX cycle configured by the base station. For example, the UE may transition to the sleep state from the awake state upon expiration of the inactivity timer if such expiration coincides with off portion of the DRX cycle, or the UE may remain in the awake state while the on duration timer is running before transitioning to the sleep state upon expiration of the on duration timer.

Figure 7:
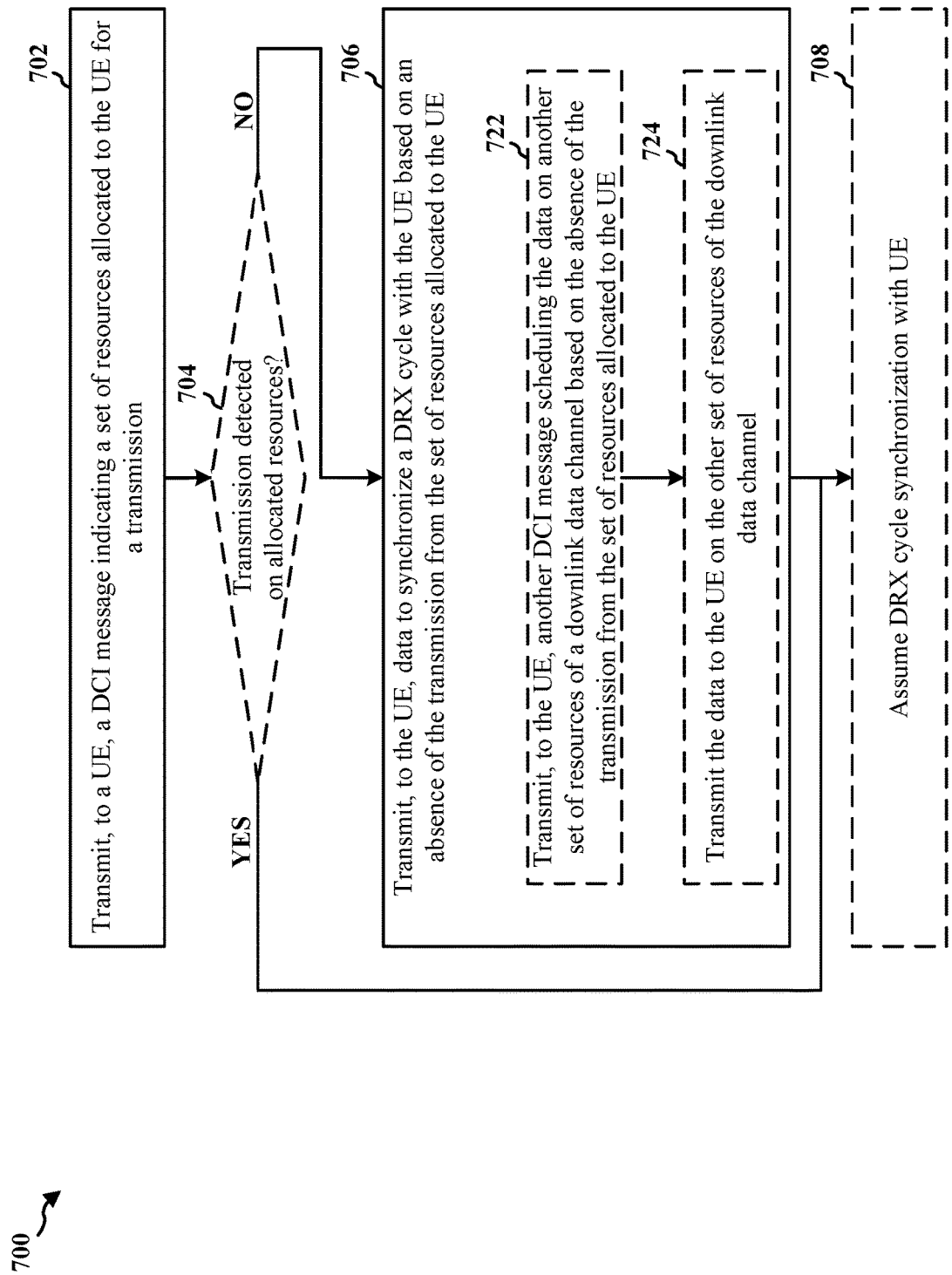
FIG. 7 is a flowchart of a method of wireless communication at a base station.

FIG. 7 is a flowchart 700 of a method of wireless communication. The method may be performed by a base station (e.g., the base station 102/180, base station 310, base station 402, base station 502), an apparatus (e.g., apparatus 902), or a component(s) thereof. In various different aspects, one or more of the illustrated operations may be transposed, omitted, or contemporaneously performed.

At 702, the base station may transmit, to a UE, a DCI message indicating a set of resources allocated to the UE for a transmission. The resources may be allocated on an uplink data channel (e.g., PUSCH) for a transmission of uplink data by the UE. In some aspects, the DCI message may be of format 0_0, format 0_1, or format 0_2. The DCI message may include an indicator value indicating an association with a retransmission. For example, the indicator value may be an NDI value that is not toggled from a previous DCI message transmitted immediately prior, which may have indicated a prior grant for the UE that was unused by the UE. Further, the DCI message may indicate an MCS to be used with the transmission, which may be an MCS value that is reserved for retransmissions and/or an RV that is greater than zero (and may be used for retransmissions).

At 704, the base station may monitor the allocated resources on the uplink data channel for uplink data from the UE. The base station may determine whether uplink data from the UE is detected on the allocated resources or uplink data from the UE is absent from the allocated resources.

If uplink data is absent from the resources allocated to the UE on the uplink data channel, the base station may fail to detect the uplink data. From the absence of the uplink data on the allocated resources, the base station may assume that the UE was in a sleep state of a DRX cycle when the DCI message was transmitted to the UE, and so the DCI message was not received by the UE. From such an assumption, the base station may deduce that the DRX cycling tracked for the UE at the base station is unsynchronized with the DRX cycling currently implemented at the UE.

At 706, the base station may transmit, to the UE, data to synchronize the DRX cycle with the UE based on the absence of the transmission from the set of resources allocated to the UE. The base station may transmit the data to force synchronization of the UE DRX cycle tracked at the base station with the DRX cycle implemented at the UE. For example, the base station may transmit another DCI message indicating scheduled resources on downlink data channel that are to carry downlink data, which. The base station may then transmit downlink data on the scheduled resources of the downlink data channel.

In some aspects, the transmission, to the UE, of data to synchronize the DRX cycle with the UE based on the absence of the transmission from the set of resources allocated to the UE, at 706, may include one or more operations, such as at 722 and 724.

At 722, the base station may transmit, to the UE, another DCI message scheduling the data on another set of resources of a downlink data channel based on the absence of the transmission from the set of resources allocated to the UE. The other DCI message may function as a common or unified point or trigger at which to initiate a respective DRX timer (e.g., DRX inactivity timer) at each of the base station and the UE. In some aspects, the DCI message may be of format 1_0, format 1_1, or format 1_2. The DCI message may include an indicator value indicating an association with a new transmission, e.g., on the downlink. For example, the indicator value may be an NDI value that is toggled from a previous DCI message indicating a prior set of resources previously scheduled on the downlink data channel for a previous downlink transmission. Further, the DCI message may indicate an MCS that will be used with the downlink transmission and/or a HARQ process of the downlink transmission.

At 724, the base station may transmit the data to the UE on the other set of resources of the downlink data channel. In some aspects, the base station may transmit "dummy" data or mock data to the UE, such as data including a set of zero or null values. Such dummy or mock data may be intended to have no effect at the UE other than to prevent the UE from determining that downlink data scheduled by the other DCI message was missed by the UE, which may cause the UE to request a retransmission, transmit NACK feedback, or otherwise throw an error. In some other aspects, the base station may transmit real data that is intended for the UE, such as data that should be transmitted to the UE regardless of the circumstance.

After uplink data is detected on the resources allocated to the UE on the uplink data channel, at 704, or after transmission, to the UE, of data to synchronize the DRX cycle with the UE based on the absence of the transmission from the set of resources allocated to the UE, at 706, then:

At 708, the base station may assume DRX cycle synchronization with the UE. That is, the base station may assume that the UE DRX cycle tracked at the base station is synchronized with the implementation of the DRX cycle at the UE. Subsequently, the base station may operate under the assumption that the tracking of the UE DRX cycle at the base station is consistent with the implementation at the UE. For example, the base station may subsequently receive an SR from the UE, and the base station may transmit a DCI message on the downlink control channel to the UE in order to provide the UE with a grant responsive to the SR. The base station may transmit such a DCI message during a time that the UE is in an awake state, as the UE DRX cycle may be synchronized at the base station and the UE. If the base station fails to receive an uplink transmission from the UE based on that DCI message, then the base station may believe that the issue resulting in the absent uplink transmission lies somewhere other than DRX cycling synchronization.

Figure 8:
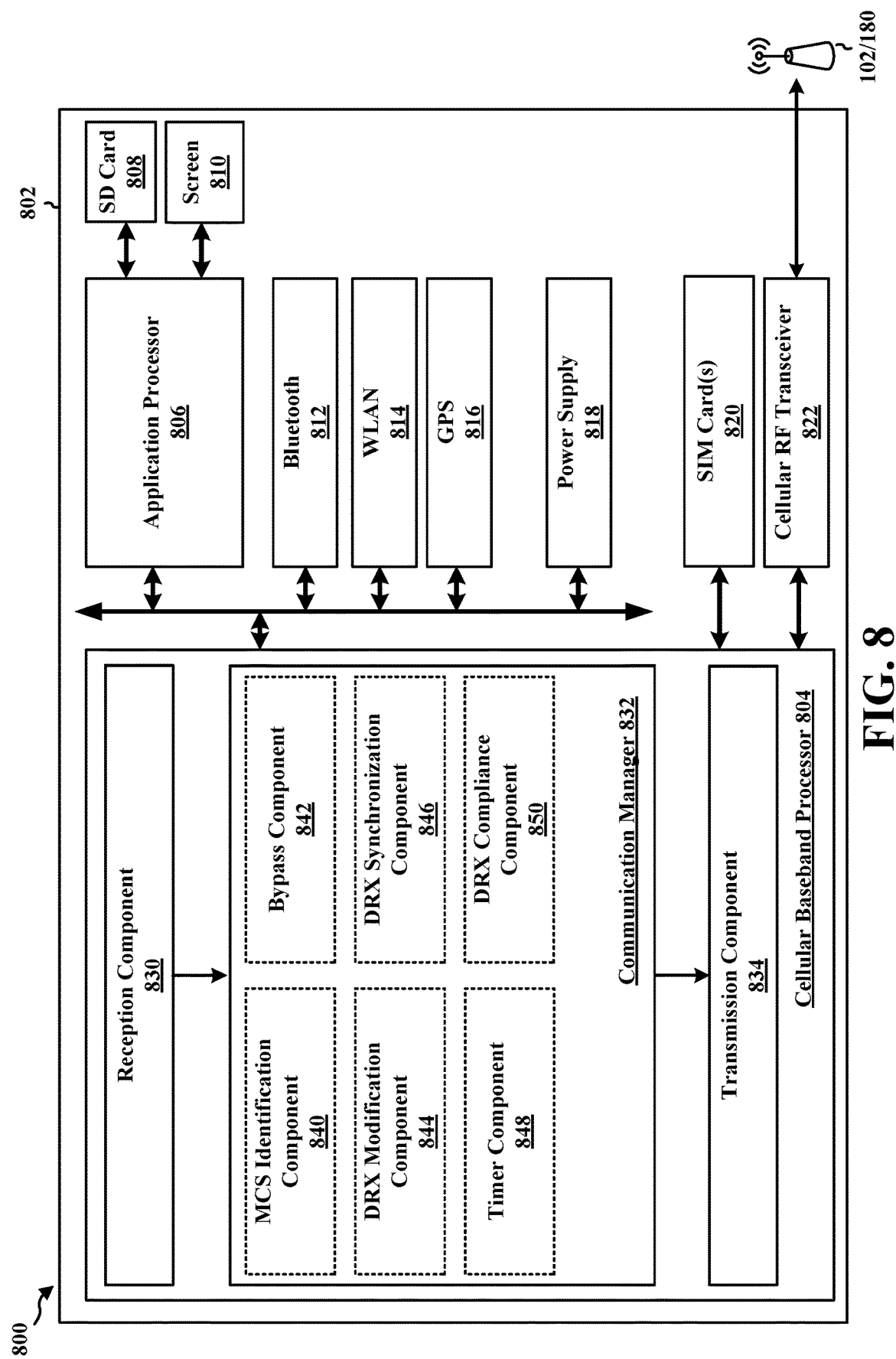
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package or module.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 3, the cellular baseband processor 804 may be a component of the UE 350 and may include the memory 360 and/or at least one of the TX processor 368, the RX processor 356, and/or the controller/processor 359. In one configuration, the apparatus 802 may be a modem chip and/or may be implemented as the baseband processor 804, while in another configuration, the apparatus 802 may be the entire UE (e.g., the UE 350 of FIG. 3) and may include some or all of the abovementioned modules, components, and/or circuitry illustrated in the context of the apparatus 802. In one configuration, the cellular RF transceiver 822 may be implemented as at least one of the transmitter 354TX and/or the receiver 354RX.

The reception component 830 may be configured to receive signaling on a wireless channel, such as signaling from a base station 82/180 or UE 104. The transmission component 834 may be configured to transmit signaling on a wireless channel, such as signaling to a base station 102/180 or UE 104. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

The reception component 830 may receive, from the base station 102/180, consecutive DCI messages that include respective indicator values that are equal, e.g., as described in connection with 602 of FIG. 6. Each of the indicator values may indicate an association of the corresponding DCI message with one of a new transmission or a retransmission. For example, each of the indicator values may be a bit value equal to either zero (0) or one (1) in an NDI field of the corresponding DCI message.

The communication manager 832 includes an MCS identification component 840, a bypass component 842, a DRX modification component 844, a DRX synchronization component 846, a timer component 848, and/or a DRX compliance component 850. The MCS identification component 840 may be configured to determine whether the value indicated in an MCS field is reserved for DCI messages associated with retransmissions, e.g., as described in connection with 604 of FIG. 6. For example, the MCS identification component 840 may compare the received value in the MCS field with one or more cell or element values of an MCS attribute or header in a table, and the MCS identification component 840 may identify a cell or element value of an MCS attribute that is equal to the received value of the MCS field. The MCS identification component 840 may identify whether the cell or element value is also associated with an attribute or header indicating that the cell or element value is reserved for control information related to retransmissions.

Where the most recent DCI message is for downlink data, the bypass component 842 may be configured to refrain from decoding data identified on a downlink data channel based on the most recent DCI message of the consecutive DCI message that indicates an MCS value within a set of reserved MCS values, e.g., as described in connection with 606 of FIG. 6. In other words, the bypass component 842 may ignore the information carried on the downlink data channel resources scheduled by the most recent DCI message.

Where such a DCI message indicates a grant for uplink data on an uplink data channel, the bypass component 842 may refrain from transmitting data to the base station 102/180 based on the most recent DCI message of the consecutive DCI message that indicates an MCS value within a set of reserved MCS values, e.g., as described in connection with 608 of FIG. 6. In other words, the bypass component 842 may ignore the uplink grant indicated by the most recently received DCI message.

However, if the most recent DCI message includes an uplink grant and the MCS value in the most recent DCI message is not included in a set of MCS values reserved for retransmission, the transmission component 834 may transmit data to the base station 102/180 based on the most recent DCI message of the consecutive DCI message that indicates an MCS value outside of the set of MCS values reserved for retransmission, e.g., as described in connection with 610 of FIG. 6.

The DRX modification component 844 may be configured to cause the apparatus 802 (e.g., at least the receive component 830) to remain in an awake state for at least a portion of a scheduled sleep state of a DRX cycle scheduled by the base station 102/180 based on the respective indicator values being equal across the consecutive DCI messages, e.g., as described in connection with 612 of FIG. 6. For example, the DRX modification component 844 may measure timing units (e.g., system frame numbers) until expiration of a DRX inactivity timer or on duration timer managed at the apparatus 802. The DRX modification component 844 may detect expiration of the timer, such as when a certain number of system frames have elapsed, as which point the apparatus 802 should transition into an inactive or sleep state according to DRX protocol. However, the DRX modification component 844 may refrain from transitioning into such an inactive or sleep state upon detecting expiration of a timer. Rather, the DRX modification component 844 may autonomously extend the on duration or active period. During this time period, the reception component 830 may monitor the control channel (e.g., PDCCH) for DCI messages intended for the apparatus 802, and potentially, the transmission component 834 may transmit (or retransmit) one or more SRs.

The DRX synchronization component 846 may be configured to synchronize the DRX cycle with the base station 102/180 while in the awake state, e.g., as described in connection with 614 of FIG. 6. Potentially, the DRX synchronization component 846 may synchronize the DRX cycle with the base station 102/180 while remaining in the awake state for the at least a portion of the scheduled sleep state. The apparatus 802 may cause the base station 102/180 and the apparatus 802 to begin measuring a DRX inactivity timer and/or DRX on duration timer from a common starting point.

In some aspects, the reception component 830 may receive another DCI message from the base station 102/180 having an indicator value indicating an association with a new transmission, e.g., as described in connection with 622 of FIG. 6. The other DCI message may be received subsequent to the consecutive DCI messages having the same (non-toggled) indicator value. For example, the reception component 830 may receive the other DCI message while autonomously extending the awake state of the apparatus 802—e.g., the reception component 830 may receive the other DCI message while remaining in the awake state during or after at least a portion of a scheduled sleep state that is scheduled for the apparatus 802 according to a DRX configuration from the base station 102/180.

The timer component 848 may initiate an inactivity timer at the apparatus 802 based on the other DCI message having the indicator value indicating the association with the new transmission, e.g., as described in connection with 624 of FIG. 6. The initiation of the inactivity timer may be synchronized with initiation of a corresponding timer at the base station 102/180 (e.g., apparatus 802 DRX inactivity timer tracked at the base station 102/180). Therefore, the DRX synchronization component 846 may acquire DRX cycle synchronization, as both the apparatus 802 and the base station 102/180 may track DRX cycles for the apparatus 802 from a common or unified event or trigger, the occurrence of which may be contemporaneously observed at both the apparatus 802 and the base station 102/180.

In some aspects where the other DCI message is of a format for granting uplink transmissions, the transmission component 834 may be configured to transmit data to the base station 102/180 based on the other DCI message having the indicator value indicating the association with the new transmission, e.g., as described in connection with 626 of FIG. 6.

In some other aspects where the other DCI message is of a format for scheduling downlink transmissions, the reception component 830 may be configured to receive data from the base station 102/180 based on the other DCI message having the indicator value indicating the association with the new transmission, e.g., as described in connection with 628 of FIG. 6.

The DRX compliance component 850 may be configured to resume compliance with the DRX cycle scheduled by the base station 102/180 based on synchronizing the DRX cycle, e.g., as described in connection with 616 of FIG. 6. For example, the DRX compliance component 850 may cause the DRX modification component 844 to cease autonomously extending the awake state upon receiving the other DCI message having the indicator value indicting an association with the new transmission.

In some aspects, the DRX compliance component 850 may be configured to resume compliance with the DRX cycle scheduled by the base station 102/180 based on synchronizing the DRX cycle by transitioning from the awake state to the sleep state of the DRX cycle scheduled by the base station 102/180 after expiration of the inactivity timer, e.g., as described in connection with 630 of FIG. 6. For example, the timer component 848 may measure the elapsed time of the inactivity timer, which was initiated upon receiving the other DCI message on the downlink control channel (e.g., PDCCH). Upon detecting that the inactivity timer has expired, the DRX compliance component 850 may resume operation according to the DRX cycle configured by the base station 102/180. For example, the DRX compliance component 850 may cause the apparatus 802 to transition to the sleep state from the awake state upon expiration of the inactivity timer if such expiration coincides with off portion of the DRX cycle, or the DRX compliance component 850 may cause the apparatus 802 to remain in the awake state while the on duration timer is running before transitioning to the sleep state upon expiration of the on duration timer.

The apparatus 802 may include additional components that perform some or all of the blocks, operations, signaling, etc. of the algorithm(s) in the aforementioned call flow diagrams and/or flowchart of FIGS. 5 and 6. As such, some or all of the blocks, operations, signaling, etc. in the aforementioned call flow diagrams and/or flowchart of FIGS. 5 and 6 may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving, from a base station, consecutive DCI messages including respective indicator values that are equal, each of the indicator values indicating an association with one of a new transmission or a retransmission; and means for remaining in an awake state for at least a portion of a scheduled sleep state of a DRX cycle scheduled by the base station based on the respective indicator values being equal across the consecutive DCI messages.

In one configuration, the apparatus 802, and in particular the cellular baseband processor 804, may further include means for synchronizing the DRX cycle with the base station while in the awake state; and means for resuming compliance with the DRX cycle scheduled by the base station based on synchronizing the DRX cycle.

In one configuration, the means for synchronizing the DRX cycle with the base station is configured to: receive, from the base station, another DCI message having an indicator value indicating an association with a new transmission; and initiating an inactivity timer at the UE based on the other DCI message having the indicator value indicating the association with the new transmission, the initiation of the inactivity timer at the UE being synchronized with initiation of a corresponding timer for the UE at the base station.

In one configuration, the apparatus 802, and in particular the cellular baseband processor 804, may further include one of: means for receiving, prior to expiration of the inactivity timer, data from the base station based on the other DCI message having the indicator value indicating the association with the new transmission, or means for transmitting data to the base station based on the other DCI message having the indicator value indicating the association with the new transmission.

In one configuration, the means for resuming compliance with the DRX cycle scheduled by the base station based on synchronizing the DRX cycle is configured to transition from the awake state to a sleep state of the DRX cycle scheduled by the base station after expiration of the inactivity timer.

In one configuration, the apparatus 802, and in particular the cellular baseband processor 804, may further include means for refraining from transmitting data to the base station based on a most recent DCI message of the consecutive DCI messages that indicates a MCS value within a set of reserved MCS values.

In one configuration, the apparatus 802, and in particular the cellular baseband processor 804, may further include means for transmitting data to the base station based on a most recent DCI message of the consecutive DCI messages that indicates a MCS value outside of a set of reserved MCS values.

In one configuration, the apparatus 802, and in particular the cellular baseband processor 804, may further include means for refraining from decoding data identified on a downlink data channel by a most recent DCI message of the consecutive DCI messages that indicates a MCS value within a set of reserved MCS values.

In one configuration, each of the indicator values corresponds to an NDI field of one of the consecutive DCI messages.

In one configuration, each of the consecutive DCI messages corresponds to one HARQ process.

The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
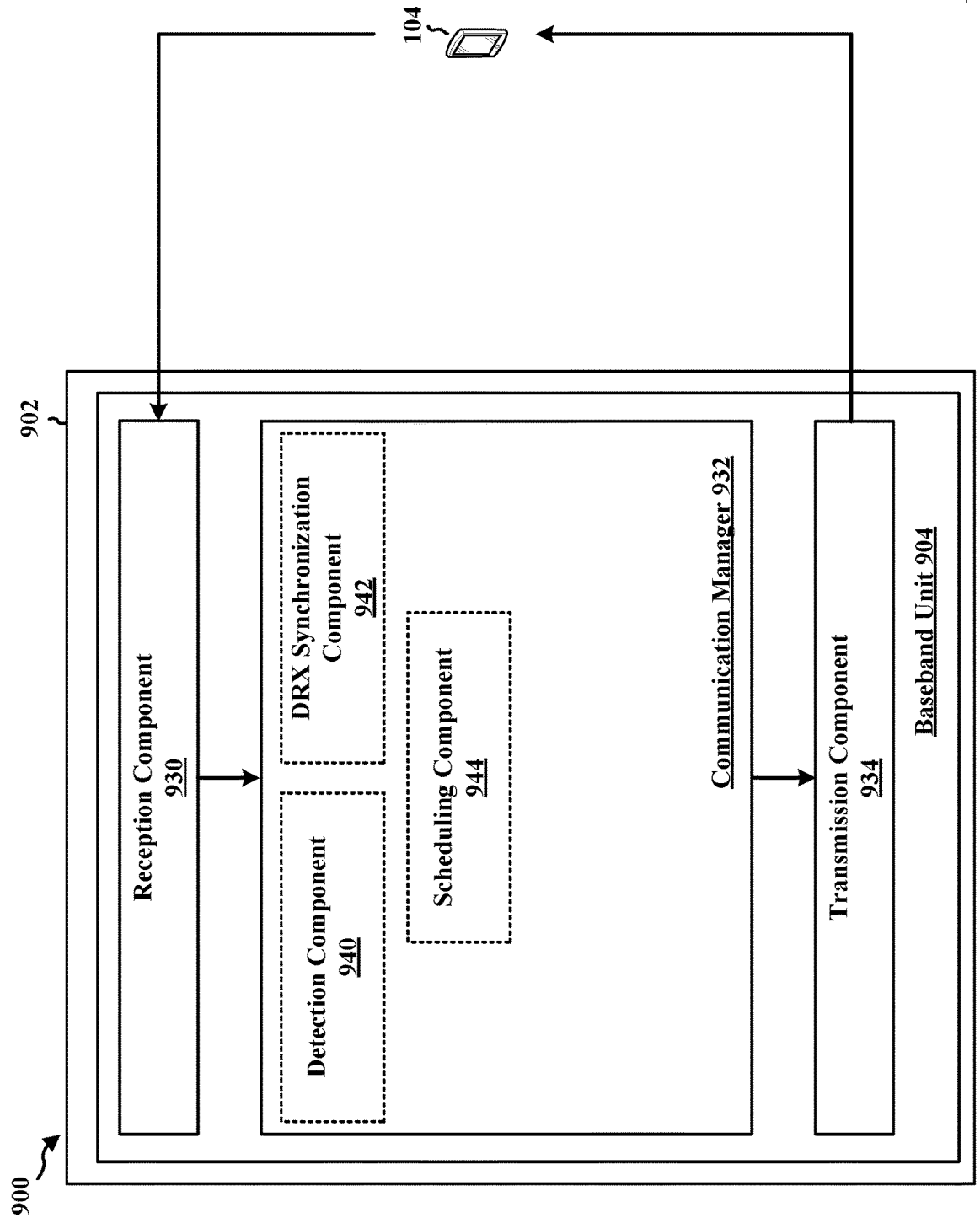
FIG. 9 is a diagram illustrating another example of a hardware implementation for another example apparatus.

FIG. 9 is a diagram 900 illustrating an example of a hardware implementation for an apparatus 902. The apparatus 902 may be a base station or similar device or system, or the apparatus 902 may be a component of a base station or similar device or system. The apparatus 902 may include a baseband unit 904. The baseband unit 904 may communicate through a cellular RF transceiver. For example, the baseband unit 904 may communicate through a cellular RF transceiver with a UE 104, such as for downlink and/or uplink communication, and/or with a base station 102/180, such as for IAB.

The baseband unit 904 may include a computer-readable medium/memory, which may be non-transitory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The reception component 930 may be configured to receive signaling on a wireless channel, such as signaling from a UE 104 (or base station 102/180). The transmission component 934 may be configured to transmit signaling on a wireless channel, such as signaling to a UE 104 or (base station 102/180). The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The transmission component 934 may be configured to transmit, to the UE 104, a DCI message indicating a set of resources allocated to the UE for a transmission, e.g., as described in connection with 702 of FIG. 7. The resources may be allocated on an uplink data channel (e.g., PUSCH) for a transmission of uplink data by the UE. In some aspects, the DCI message may be of format 0_0, format 0_1, or format 0_2. The DCI message may include an indicator value indicating an association with a retransmission. For example, the indicator value may be an NDI value that is not toggled from a previous DCI message transmitted immediately prior, which may have indicated a prior grant for the UE that was unused by the UE. Further, the DCI message may indicate an MCS to be used with the transmission, which may be an MCS value that is reserved for retransmissions and/or an RV that is greater than zero (and may be used for retransmissions).

The communication manager 932 may include one or more of a detection component 940, a DRX synchronization component 942, and/or a scheduling component 944. The detection component 940 may be configured to monitor the allocated resources on the uplink data channel for uplink data from the UE 104, e.g., as described in connection with 704 of FIG. 7. The detection component 940 may determine whether uplink data from the UE 104 is detected on the allocated resources or uplink data from the UE 104 is absent from the allocated resources.

If uplink data is absent from the resources allocated to the UE 104 on the uplink data channel, the detection component 940 may fail to detect the uplink data. From the absence of the uplink data on the allocated resources, the DRX synchronization component 942 may assume that the UE 104 was in a sleep state of a DRX cycle when the DCI message was transmitted, and so the DCI message was not received by the UE 104. From such an assumption, the DRX synchronization component 942 may deduce that the DRX cycling tracked for the UE 104 at the DRX synchronization component 942 is unsynchronized with the DRX cycling currently implemented at the UE 104.

Therefore, the DRX synchronization component 942 may generate and transmit (through the transmission component 934), to the UE 104, data to synchronize the DRX cycle with the UE 104 based on the absence of the transmission from the set of resources allocated to the UE 104, e.g., as described in connection with 706 of FIG. 7. The DRX synchronization component 942 may generate and transmit the data to force synchronization of the UE DRX cycle tracked at the DRX synchronization component 942 with the DRX cycle implemented at the UE 104.

In some aspects, the scheduling component 944 may schedule another set of resources on a downlink data channel to carry downlink data to the UE 104, and the scheduling component 944 may transmit (through the transmission component 934) another DCI message scheduling the downlink data on the other set of resources of a downlink data channel based on the absence of the transmission from the set of resources allocated to the UE 104, e.g., as described in connection with 722 of FIG. 7. The other DCI message may function as a common or unified point or trigger at which to initiate a respective DRX timer (e.g., DRX inactivity timer) at each of the DRX synchronization component 942 and the UE 104. In some aspects, the DCI message may be of format 1_0, format 1_1, or format 1_2. The DCI message may include an indicator value indicating an association with a new transmission, e.g., on the downlink. For example, the indicator value may be an NDI value that is toggled from a previous DCI message indicating a prior set of resources previously scheduled on the downlink data channel for a previous downlink transmission. Further, the DCI message may indicate an MCS that will be used with the downlink transmission and/or a HARQ process of the downlink transmission.

The DRX synchronization component 942 may generate and transmit (through the transmission component 934) the data to the UE 104 on the other set of resources of the downlink data channel, e.g., as described in connection with 724 of FIG. 7. In some aspects, the DRX synchronization component 942 may generate and transmit "dummy" data or mock data to the UE 104, such as data including a set of zero or null values. Such dummy or mock data may be intended to have no effect at the UE 104 other than to prevent the UE 104 from determining that downlink data scheduled by the other DCI message was missed by the UE 104, which may cause the UE 104 to request a retransmission, transmit NACK feedback, or otherwise throw an error. In some other aspects, the DRX synchronization component 942 may cause transmission of real data that is intended for the UE 104, such as data that should be transmitted to the UE 104 regardless of the circumstance.

After uplink data is detected on the resources allocated to the UE 104 on the uplink data channel, or after transmission, to the UE 104, of data to synchronize the DRX cycle with the UE 104 based on the absence of the transmission from the set of resources allocated to the UE 104, the scheduling component 944 may assume DRX cycle synchronization with the UE 104, e.g., as described in connection with 708 of FIG. 7. That is, the scheduling component 944 may assume that the UE DRX cycle tracked at the DRX synchronization component 942 is synchronized with the implementation of the DRX cycle at the UE 104.

The apparatus 902 may include additional components that perform some or all of the blocks, operations, signaling, etc. of the algorithm(s) in the aforementioned call flow diagrams and/or flowchart of FIGS. 5 and 7. As such, some or all of the blocks, operations, signaling, etc. in the aforementioned call flow diagrams and/or flowchart of FIGS. and 5 and 7 may be performed by a component and the apparatus 902 may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 902, and in particular the baseband unit 904, includes means for transmitting, to a UE, a DCI message indicating a set of resources allocated to the UE for a transmission; and means for transmitting, to the UE, data to synchronize a DRX cycle with the UE based on an absence of the transmission from the set of resources allocated to the UE.

In one configuration, the data is transmitted to synchronize the DRX cycle with the UE by restarting an inactivity timer at the UE.

In one configuration, the means for transmitting the data to synchronize the DRX cycle with the UE is configured to: transmit, to the UE, another DCI message scheduling the data on another set of resources of a downlink data channel based on the absence of the transmission from the set of resources allocated to the UE; and transmit the data to the UE on the other set of resources of the downlink data channel.

In one configuration, the data comprises dummy data.

In one configuration, the DCI message further indicates at least one of a MCS value that is within a set of reserved MCS values or a redundancy value that is greater than 0.

The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is an apparatus for wireless communication at a UE, including: a processor; a memory coupled with the processor; and instructions stored in the memory and operable, when executed by the processor, to cause the apparatus to: receive, from a base station, consecutive DCI messages including respective indicator values that are equal, each of the indicator values indicating an association with one of a new transmission or a retransmission; and remain in an awake state for at least a portion of a scheduled sleep state of a DRX cycle scheduled by the base station based on the respective indicator values being equal across the consecutive DCI messages.

Example 2 may be the apparatus of Example 1, and the instructions are further operable, when executed by the processor, to cause the apparatus to: synchronize the DRX cycle with the base station while in the awake state; and resume compliance with the DRX cycle scheduled by the base station based on synchronizing the DRX cycle.

Example 3 may be the apparatus of Example 2, and the synchronization with the DRX cycle with the base station includes to: receive, from the base station, another DCI message having an indicator value indicating an association with a new transmission; and initiate an inactivity timer at the UE based on the other DCI message having the indicator value indicating the association with the new transmission, the initiation of the inactivity timer at the UE being synchronized with initiation of a corresponding timer for the UE at the base station.

Example 4 may be the apparatus of Example 3, and the instructions are further operable, when executed by the processor, to cause the apparatus to one of: receive, prior to expiration of the inactivity timer, data from the base station based on the other DCI message having the indicator value indicating the association with the new transmission, or transmit data to the base station based on the other DCI message having the indicator value indicating the association with the new transmission.

Example 5 may be the apparatus of any of Examples 3 or 4, and the resumption of compliance with the DRX cycle scheduled by the base station based on synchronizing the DRX cycle includes to: transition from the awake state to a sleep state of the DRX cycle scheduled by the base station after expiration of the inactivity timer.

Example 6 may be the apparatus of any of Examples 1 to 5, and the instructions are further operable, when executed by the processor, to cause the apparatus to: refrain from transmitting data to the base station based on a most recent DCI message of the consecutive DCI messages that indicates a MCS value within a set of reserved MCS values.

Example 7 may be the apparatus of any of Examples 1 to 5, and the instructions are further operable, when executed by the processor, to cause the apparatus to: transmit data to the base station based on a most recent DCI message of the consecutive DCI messages that indicates a MCS value outside of a set of reserved MCS values.

Example 8 may be the apparatus of any of Examples 1 to 4, and the instructions are further operable, when executed by the processor, to cause the apparatus to: refrain from decoding data identified on a downlink data channel by a most recent DCI message of the consecutive DCI messages that indicates a MCS value within a set of reserved MCS values.

Example 9 may be the apparatus of any of Examples 1 to 8, and each of the indicator values corresponds to a NDI field of one of the consecutive DCI messages.

Example 10 may be the apparatus of any of Examples 1 to 9, and each of the consecutive DCI messages corresponds to one HARQ process.

Example 11 may be an apparatus for wireless communication at a base station, including: a processor; memory coupled with the processor; and instructions stored in the memory and operable, when executed by the processor, to cause the apparatus to: transmit, to a UE, a DCI message indicating a set of resources allocated to the UE for a transmission; and transmit, to the UE, data to synchronize a DRX cycle with the UE based on an absence of the transmission from the set of resources allocated to the UE.

Example 12 may be the apparatus of Example 11, and the data is transmitted to synchronize the DRX cycle with the UE by restarting an inactivity timer at the UE.

Example 13 may be the apparatus of any of Examples 11 or 12, and the transmission of the data to synchronize the DRX cycle with the UE includes to: transmit, to the UE, another DCI message scheduling the data on another set of resources of a downlink data channel based on the absence of the transmission from the set of resources allocated to the UE; and transmit the data to the UE on the other set of resources of the downlink data channel.

Example 14 may be the apparatus of any of Examples 11 to 13, and the data includes dummy data.

Example 15 may be the apparatus of any of Examples 11 to 14, and the DCI message further indicates at least one of a MCS value that is within a set of reserved MCS values or a redundancy value that is greater than 0.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
receiving, from a base station, consecutive downlink control information (DCI) messages including respective indicator values that are equal, each of the indicator values indicating an association with one of a new transmission or a retransmission;
remaining in an awake state for at least a portion of a scheduled sleep state of a discontinuous reception (DRX) cycle scheduled by the base station based on the respective indicator values being equal across the consecutive DCI messages;
synchronizing the DRX cycle with the base station while in the awake state; and
resuming compliance with the DRX cycle scheduled by the base station based on synchronizing the DRX cycle,
wherein synchronizing the DRX cycle with the base station comprises:
receiving, from the base station, another DCI message having an indicator value indicating an association with a new transmission; and
initiating an inactivity timer at the UE based on the other DCI message having the indicator value indicating the association with the new transmission, the initiation of the inactivity timer at the UE being synchronized with initiation of a corresponding timer for the UE at the base station;
and either:
receiving, prior to expiration of the inactivity timer, data from the base station based on the other DCI message having the indicator value indicating the association with the new transmission, or
transmitting data to the base station based on the other DCI message having the indicator value indicating the association with the new transmission.

2. The method of claim 1, wherein the resuming compliance with the DRX cycle scheduled by the base station based on synchronizing the DRX cycle comprises:
transitioning from the awake state to a sleep state of the DRX cycle scheduled by the base station after expiration of the inactivity timer.

3. The method of claim 1, further comprising:
refraining from transmitting data to the base station based on a most recent DCI message of the consecutive DCI messages that indicates a modulation and coding scheme (MCS) value within a set of reserved MCS values.

4. The method of claim 1, further comprising:
transmitting data to the base station based on a most recent DCI message of the consecutive DCI messages that indicates a modulation and coding scheme (MCS) value outside of a set of reserved MCS values.

5. The method of claim 1, further comprising:
refraining from decoding data identified on a downlink data channel by a most recent DCI message of the consecutive DCI messages that indicates a modulation and coding scheme (MCS) value within a set of reserved MCS values.

6. The method of claim 1, wherein each of the indicator values corresponds to a new data indicator (NDI) field of one of the consecutive DCI messages.

7. The method of claim 1, wherein each of the consecutive DCI messages corresponds to one hybrid automatic repeat request (HARQ) process.

8. A method of wireless communication at a base station, comprising:
transmitting, to a user equipment (UE), a downlink control information (DCI) message indicating a set of resources allocated to the UE for a transmission;
transmitting, to the UE, data to synchronize a discontinuous reception (DRX) cycle with the UE based on an absence of the transmission from the set of resources allocated to the UE, wherein the data is transmitted to synchronize the DRX cycle with the UE by restarting an inactivity timer at the UE;
transmitting, to the UE, another DCI message having an indicator value indicating an association with a new transmission;
and either:
transmitting, prior to expiration of the inactivity timer, data to the UE based on the other DCI message having the indicator value indicating the association with the new transmission, or
receiving data from the UE based on the other DCI message having the indicator value indicating the association with the new transmission.

9. The method of claim 8, wherein the transmitting the data to synchronize the DRX cycle with the UE comprises:
transmitting, to the UE, another DCI message scheduling the data on another set of resources of a downlink data channel based on the absence of the transmission from the set of resources allocated to the UE; and
transmitting the data to the UE on the other set of resources of the downlink data channel.

10. The method of claim 8, wherein the data comprises dummy data.

11. The method of claim 8, wherein the DCI message further indicates at least one of a modulation and coding scheme (MCS) value that is within a set of reserved MCS values or a redundancy value that is greater than 0.

12. An apparatus for wireless communication at a user equipment (UE), comprising:
a processor;
memory coupled with the processor; and
instructions stored in the memory and operable, when executed by the processor, to cause the apparatus to:
receive, from a base station, consecutive downlink control information (DCI) messages including respective indicator values that are equal, each of the indicator values indicating an association with one of a new transmission or a retransmission;
remain in an awake state for at least a portion of a scheduled sleep state of a discontinuous reception (DRX) cycle scheduled by the base station based on the respective indicator values being equal across the consecutive DCI messages;
synchronize the DRX cycle with the base station while in the awake state:
resume compliance with the DRX cycle scheduled by the base station based on synchronizing the DRX cycle, wherein the synchronization with the DRX cycle with the base station comprises to:
receive, from the base station, another DCI message having an indicator value indicating an association with a new transmission; and
initiate an inactivity timer at the UE based on the other DCI message having the indicator value indicating the association with the new transmission, the initiation of the inactivity timer at the UE being synchronized with initiation of a corresponding timer for the UE at the base station;

and either:
receive, prior to expiration of the inactivity timer, data from the base station based on the other DCI message having the indicator value indicating the association with the new transmission, or
transmit data to the base station based on the other DCI message having the indicator value indicating the association with the new transmission.

13. The apparatus of claim 12, wherein the resumption of compliance with the DRX cycle scheduled by the base station based on synchronizing the DRX cycle comprises to:
transition from the awake state to a sleep state of the DRX cycle scheduled by the base station after expiration of the inactivity timer.

14. The apparatus of claim 12, wherein the instructions are further operable, when executed by the processor, to cause the apparatus to:
refrain from transmitting data to the base station based on a most recent DCI message of the consecutive DCI messages that indicates a modulation and coding scheme (MCS) value within a set of reserved MCS values.

15. The apparatus of claim 12, wherein the instructions are further operable, when executed by the processor, to cause the apparatus to:
transmit data to the base station based on a most recent DCI message of the consecutive DCI messages that indicates a modulation and coding scheme (MCS) value outside of a set of reserved MCS values.

16. The apparatus of claim 12, wherein the instructions are further operable, when executed by the processor, to cause the apparatus to:
refrain from decoding data identified on a downlink data channel by a most recent DCI message of the consecutive DCI messages that indicates a modulation and coding scheme (MCS) value within a set of reserved MCS values.

17. The apparatus of claim 12, wherein each of the indicator values corresponds to a new data indicator (NDI) field of one of the consecutive DCI messages.

18. The apparatus of claim 12, wherein each of the consecutive DCI messages corresponds to one hybrid automatic repeat request (HARQ) process.

19. An apparatus for wireless communication at a base station, comprising:
a processor;
memory coupled with the processor; and
instructions stored in the memory and operable, when executed by the processor, to cause the apparatus to:
transmit, to a user equipment (UE), a downlink control information (DCI) message indicating a set of resources allocated to the UE for a transmission; and
transmit, to the UE, data to synchronize a discontinuous reception (DRX) cycle with the UE based on an absence of the transmission from the set of resources allocated to the UE, wherein the data is transmitted to synchronize the DRX cycle with the UE by restarting an inactivity timer at the UE;
transmit, to the UE, another DCI message having an indicator value indicating an association with a new transmission;

and either:
transmit, prior to expiration of the inactivity timer, data to the UE based on the other DCI message having the indicator value indicating the association with the new transmission, or
receive data from the UE based on the other DCI message having the indicator value indicating the association with the new transmission.

20. The apparatus of claim 19, wherein the transmission of the data to synchronize the DRX cycle with the UE comprises to:
transmit, to the UE, another DCI message scheduling the data on another set of resources of a downlink data channel based on the absence of the transmission from the set of resources allocated to the UE; and
transmit the data to the UE on the other set of resources of the downlink data channel.

21. The apparatus of claim 19, wherein the data comprises dummy data.

22. The apparatus of claim 19, wherein the DCI message further indicates at least one of a modulation and coding scheme (MCS) value that is within a set of reserved MCS values or a redundancy value that is greater than 0.

* * * * *